United States Patent
Myoki et al.

(10) Patent No.: US 7,437,315 B2
(45) Date of Patent: Oct. 14, 2008

(54) MERCHANDISE SALES SYSTEM FOR SELLING MERCHANDISE PRODUCED BY PRINTING IMAGE DATA ON A PRINTING MEDIUM

(75) Inventors: Yutaka Myoki, Kanagawa (JP); Shinichi Suzuki, Tokyo (JP); Kikuo Naito, Kanagawa (JP); Miwa Takagi, Tokyo (JP); Masanori Saito, Kanagawa (JP); Tomoko Eguchi, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 554 days.

(21) Appl. No.: 10/836,225

(22) Filed: May 3, 2004

(65) Prior Publication Data
US 2004/0254852 A1 Dec. 16, 2004

(30) Foreign Application Priority Data
May 7, 2003 (JP) .............................. 2003-128918

(51) Int. Cl.
G06Q 30/00 (2006.01)
G06F 17/30 (2006.01)
(52) U.S. Cl. .......................................... 705/26; 705/27
(58) Field of Classification Search ............. 705/26–27; 369/429, 639
See application file for complete search history.

(56) References Cited

U.S. PATENT DOCUMENTS 5,974,401 A * 10/1999 Enomoto et al. .............. 705/40
6,017,157 A * 1/2000 Garfinkle et al. ............. 396/639
6,367,991 B1 * 4/2002 Garfinkle et al. ............. 396/639
2001/0021311 A1 * 9/2001 Mizumo ..................... 396/429
2003/0023505 A1 * 1/2003 Eglen et al. .................... 705/26
2003/0033429 A1 2/2003 Myoki ......................... 709/238
2003/0065531 A1 4/2003 Satomi et al. .................. 705/1

OTHER PUBLICATIONS www.snapfish.com. Jan. 30, 2003-Feb. 10, 2003 [recovered via www.Archive.org on Jul. 24, 2008].*

* cited by examiner

*Primary Examiner*—Jeffrey A. Smith
*Assistant Examiner*—William J. Allen
(74) *Attorney, Agent, or Firm*—Fitzpatrick, Cella, Harper & Scinto

(57) ABSTRACT

This disclosure relates to a method and apparatus for implementing online sales in an environment on a network, which is provided by a creator, without putting any load on the creator. A creator-side apparatus transmits a content that forms merchandise and merchandise information about its output medium to a support-side apparatus. The support-side apparatus makes the merchandise information correspond to an address that indicates a location on the network and transmits the address to the creator-side apparatus as an address where an order for the merchandise should be received. The creator-side apparatus sends data containing the address to the network to which an orderer-side apparatus is connected such that the orderer-side apparatus accepts connection to the location. The support-side apparatus executes merchandise order reception processing when the orderer-side apparatus is connected to the location and requests an output system to execute output processing based on the merchandise information.

7 Claims, 30 Drawing Sheets

FIG. 4

| OBJECT OF CGI | URL | CGI PROGRAM NAME | PROCESSING | |
|---|---|---|---|---|
| CREATOR REGISTRATION | http://www.server.jp/cgi/welcome1 | welcome1 | REGISTRATION CONTENT INPUT WINDOW DISPLAY | 401 |
| | http://www.server.jp/cgi/welcome2 | welcome2 | REGISTRATION PROCESSING | 402 |
| SALES MERCHANDISE REGISTRATION | http://www.server.jp/cgi/creator1 | creator1 | LOGIN WINDOW DISPLAY | 403 |
| | http://www.server.jp/cgi/creator2 | creator2 | LOGIN PROCESSING | 404 |
| | http://www.server.jp/cgi/creator3 | creator3 | SALES MERCHANDISE REGISTRATION PROCESSING | 405 |
| ORDER | http://www.server.jp/cgi/order1 | order1 | ADD MERCHANDISE IN CART | 406 |
| | http://www.server.jp/cgi/order2 | order2 | ORDER CONTENTS OF CART | 407 |

FIG. 6

| | URL | FILE PATH NAME | IMAGE | IMAGE SIZE (HEIGHT × WIDTH) (PIXELS) |
|---|---|---|---|---|
| PRINT IMAGE | http://www.creator.jp/images/image1.jpg | /var/www/images/image1.jpg | 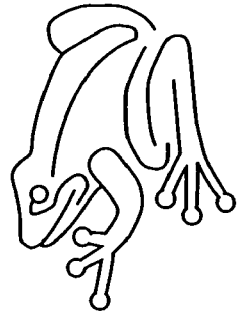 | 1200×800 |
| | http://www.creator.jp/images/image2.jpg | /var/www/images/image2.jpg | 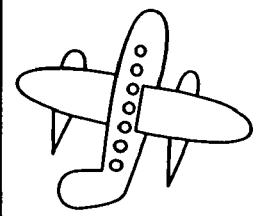 | 800×600 |
| THUMBNAIL IMAGE | http://www.creator.jp/thumb/thumb1.jpg | /var/www/thumbs/thumb1.jpg |  | 60×40 |
| | http://www.creator.jp/thumb/thumb2.jpg | /var/www/thumbs/thumb2.jpg | 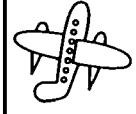 | 60×45 |
| HTML | http://www.creator.jp/html/order.html | /var/www/html/order.html | | |

| PRINT MERCHANDISE CODE (PK) | PRINT MERCHANDISE NAME | COST (MINIMUM SELLING PRICE) (YEN) | ALLOWABLE RESOLUTION (HEIGHT PIXELS) | ALLOWABLE RESOLUTION (WIDTH PIXELS) | ORDER UNIT NAME | MERCHANDISE UNIT NAME | NUMBER OF PIECES OF MERCHANDISE PER ORDER |
|---|---|---|---|---|---|---|---|
| TS-W-S | T-SHIRT (WHITE) S SIZE | 3000 | 1200 | 800 | SET | PIECE | 1 |
| TS-W-M | T-SHIRT (WHITE) M SIZE | 3000 | 1200 | 800 | SET | PIECE | 1 |
| TS-W-L | T-SHIRT (WHITE) L SIZE | 3000 | 1200 | 800 | SET | PIECE | 1 |
| PST-N-A0 | POSTER (GLOSSY PAPER) A0 | 10000 | 8000 | 6000 | SET | PIECE | 1 |
| PST-L-A0 | POSTER (LAMINATED) A0 | 10000 | 8000 | 6000 | SET | PIECE | 1 |
| PC | POST CARD | 500 | 800 | 600 | ASSORTMENT | PIECE | 5 |
| MC-W | MUG (WHITE) | 3500 | 800 | 600 | SET | PIECE | 1 |
| MC-BLK | MUG (BLACK) | 3500 | 800 | 600 | SET | PIECE | 1 |

WELCOME TO CREATOR REGISTRATION!
PLEASE COMPLETE FORM AND CLICK ON OK BUTTON.

| Field | | |
|---|---|---|
| CREATOR ID OF YOUR CHOICE | | 1401 |
| PASSWORD | | 1402 |
| NAME | | 1403 |
| POSTAL CODE | | 1404 |
| ADDRESS | | 1405 |
| TELEPHONE NUMBER | | 1406 |
| MAIL ADDRESS | | 1407 |
| SALES PAGE URL | | 1408 |
| REMITTANCE DESTINATION FINANCIAL AGENCY | | 1409 |
| REMITTANCE DESTINATION BRANCH | | 1410 |
| REMITTANCE DESTINATION ACCOUNT TYPE | ○ SAVINGS   ○ CHECKING | 1411 |
| REMITTANCE DESTINATION ACCOUNT NUMBER | | 1412 |
| REMITTANCE DESTINATION ACCOUNT HOLDER NAME | | 1413 |

WELCOME TO CREATOR REGISTRATION!
PLEASE COMPLETE FORM AND CLICK ON OK BUTTON.

| | | |
|---|---|---|
| CREATOR ID OF YOUR CHOICE | XXX | 1501 |
| PASSWORD | *** | 1502 |
| NAME | TARO YYY | 1503 |
| POSTAL CODE | 146-8501 | 1504 |
| ADDRESS | XXX SHIMOMARUKO OTA-KU TOKYO | 1505 |
| TELEPHONE NUMBER | 03-XXXX-XXXX | 1506 |
| MAIL ADDRESS | xxx@creator.jp | 1507 |
| SALES PAGE URL | http://www.creator.jp/html/order.html | 1508 |
| REMITTANCE DESTINATION FINANCIAL AGENCY | YYY BANK | 1509 |
| REMITTANCE DESTINATION BRANCH | SHIMOMARUKO BRANCH | 1510 |
| REMITTANCE DESTINATION ACCOUNT TYPE | ● SAVINGS   ○ CHECKING | 1511 |
| REMITTANCE DESTINATION ACCOUNT NUMBER | 1234567890 | 1512 |
| REMITTANCE DESTINATION ACCOUNT HOLDER NAME | TARO YYY | 1513 |

| | | |
|---|---|---|
| CREATOR ID | XXX | 1601 |
| PASSWORD | XXX | 1602 |
| NAME | TARO YYY | 1603 |
| POSTAL CODE | 146-8501 | 1604 |
| ADDRESS | ××× SHIMOMARUKO OTA-KU TOKYO | 1605 |
| TELEPHONE NUMBER | 03-XXX-XXXX | 1606 |
| MAIL ADDRESS | xxx@creator.jp | 1607 |
| SALES PAGE URL | http://www.creator.jp/html/order.html | 1608 |
| REMITTANCE DESTINATION FINANCIAL AGENCY | YYY BANK | 1609 |
| REMITTANCE DESTINATION BRANCH | SHIMOMARUKO BRANCH | 1610 |
| REMITTANCE DESTINATION ACCOUNT TYPE | SAVINGS | 1611 |
| REMITTANCE DESTINATION ACCOUNT NUMBER | 1234567890 | 1612 |
| REMITTANCE DESTINATION ACCOUNT HOLDER NAME | TARO YYY | 1613 |

CREATOR REGISTRATION IS COMPLETED

CREATOR REGISTRATION IS COMPLETED.

URL FOR SALES MERCHANDISE REGISTRATION IS http://www.server.jp/cgi/creator1

SALES MERCHANDISE REGISTRATION

PLEASE SELECT PRINT MERCHANDISE, INPUT URL AND
SELLING PRICE OF PRINT IMAGE, AND CLICK ON OK BUTTON.

| | | |
|---|---|---|
| PRINT MERCHANDISE | T-SHIRT (WHITE) S SIZE ▼ | 2201 |
| PRINT IMAGE URL | http://www.creator.jp/images/image1.jpg | 2202 |
| THUMBNAIL IMAGE URL | http://www.creator.jp/thumb/thumb1.jpg | 2203 |
| SELLING PRICE | 4000 | 2204 |

```
                                              2300
                                               )
┌─────────────────────────────────────────────────┐
│        SALES MERCHANDISE REGISTRATION RESULT    │
│      FOLLOWING CONTENTS HAVE BEEN REGISTERED.   │
│            SALES URL IS AS FOLLOWS.             │
│                                                 │
│                    http://www.server.jp/cgi/order1?cid=
│        SALES URL   XXX&pid=1001                 │ ~ 2301
│                                                 │
│   PRINT MERCHANDISE  T-SHIRT (WHITE) S SIZE     │ ~ 2302
│                                                 │
│                      http://www.creator.jp/images/
│       PRINT IMAGE URL  image1.jpg               │ ~ 2303
│                                                 │
│                        http://www.creator.jp/thumb/
│    THUMBNAIL IMAGE URL  thumb1.jpg              │ ~ 2304
│                                                 │
│       SELLING PRICE   4000 YEN                  │ ~ 2305
│                                                 │
└─────────────────────────────────────────────────┘
```

FIG. 24

| CREATOR ID | SALES MERCHANDISE ID | PRINT MERCHANDISE CODE | PRINT IMAGE URL | THUMBNAIL IMAGE URL | SELLING PRICE |
|---|---|---|---|---|---|
| | | | | | ⌐2401 ⌐2402 ⌐2403 ⌐2404 |
| XXX | 1001 | TS-W-S | http://www.creator.jp/images/image1.jpg | http://www.creator.jp/thumb/thumb1.jpg | 4000 |
| XXX | 1002 | TS-W-M | http://www.creator.jp/images/image1.jpg | http://www.creator.jp/thumb/thumb1.jpg | 4000 |
| XXX | 1003 | TS-W-L | http://www.creator.jp/images/image1.jpg | http://www.creator.jp/thumb/thumb1.jpg | 4000 |
| XXX | 1004 | PC | http://www.creator.jp/images/image2.jpg | http://www.creator.jp/thumb/thumb2.jpg | 700 |

FIG. 27

FIG. 28
PLEASE INPUT NUMBER OF PIECES OF MERCHANDISE AND DELIVERY DESTINATION AND CLICK ON ORDER BUTTON.
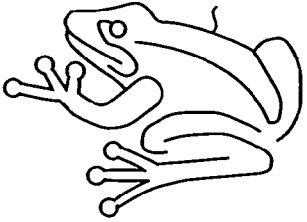
2801
T-SHIRT (WHITE) M SIZE ~2802
4,000 YEN
2803 — [ 2 ] SET (1 SET = 1 PIECE) ~2804
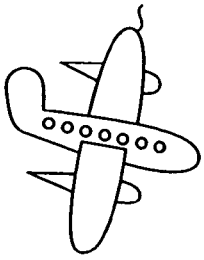
2805
POSTCARD ~2806
700 YEN
2807 — [ 1 ] ASSORTMENT (1 ASSORTMENT = 5 SHEETS) ~2808
| DELIVERY DESTINATION ADDRESS | XYZ IMAIKAMI-CHO NAKAHARA-KU, KAWASAKI-SHI | 2809 |
| DELIVERY DESTINATION NAME | HANAKO KOSUGI | 2810 |
| DELIVERY DESTINATION TELEPHONE NUMBER | 044-XXX-XXXX | 2811 |
[ ORDER ] ~2812

FIG. 29

| | | |
|---|---|---|
| ORDER ID | 1001 | ~2901 |
| CREATOR ID | XXX | ~2902 |
| DELIVERY DESTINATION ADDRESS | | ~2903 |
| DELIVERY DESTINATION NAME | | ~2904 |
| DELIVERY DESTINATION TELEPHONE NUMBER | | ~2905 |
| SALES MERCHANDISE ID #1 | 1002 | ~2906-1 |
| NUMBER #1 | | ~2907-1 |
| SALES MERCHANDISE ID #1 | 1004 | ~2906-2 |
| NUMBER #2 | | ~2907-2 |
| TOTAL SALES AMOUNT (YEN) | | ~2910 |
| CONSUMPTION TAX AMOUNT (YEN) | | ~2911 |
| TOTAL COST AMOUNT (YEN) | | ~2912 |
| FORMAL ORDER FLAG | OFF | ~2913 |

| | | |
|---|---|---|
| ORDER ID | 1001 | 3001 |
| CREATOR ID | XXX | 3002 |
| DELIVERY DESTINATION ADDRESS | XYZ IMAIKAMI-CHO NAKAHARA-KU, KAWASAKI-SHI | 3003 |
| DELIVERY DESTINATION NAME | HANAKO KOSUGI | 3004 |
| DELIVERY DESTINATION TELEPHONE NUMBER | 044-XXX-XXXX | 3005 |
| SALES MERCHANDISE ID #1 | 1002 | 3006 |
| NUMBER #1 | 2 | 3007 |
| SALES MERCHANDISE ID #1 | 1004 | 3008 |
| NUMBER #2 | 1 | 3009 |
| TOTAL SALES AMOUNT (YEN) | 8,700 | 3010 |
| CONSUMPTION TAX AMOUNT (YEN) | 435 | 3011 |
| TOTAL COST AMOUNT (YEN) | 6,500 | 3012 |
| FORMAL ORDER FLAG | ON | 3013 |

MERCHANDISE SALES SYSTEM FOR SELLING MERCHANDISE PRODUCED BY PRINTING IMAGE DATA ON A PRINTING MEDIUM

FIELD OF THE INVENTION

This invention relates to a method and apparatus for supplying, managing, or selling merchandise to distribute it in a network environment.

BACKGROUND OF THE INVENTION

Contents such as images and music are works, and their copyrights are the property of their respective creators such as illustrators, photographers, and CG designers. To sell merchandise including such contents on line, it is necessary to build and operate a system capable of order reception management, inventory control, accounting processing, shipment processing, and the like. However, it is often difficult for a creator to execute this operation.

In addition, creators must prepare in advance merchandise to be sold. If the merchandise remains unsold, they suffer overstock.

SUMMARY OF THE INVENTION

Accordingly, it is an object of the present invention to provide a method, apparatus, and computer program to execute online sales in a network environment while reducing load on a creator.

According to the present invention, a support server issues to a creator the address of a location on a network where an order for the creator's merchandise should be received. The creator can cause the support server to execute merchandise order reception processing only by making a purchaser access the location indicated by the issued address. Accordingly, load on a creator who wants to sell his/her contents can be reduced.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a table showing the types of CGI programs, mapping to URLs, and program names in the support server;

FIG. 6 is a table showing mapping between URLs and path names, and file contents in the creator server;

FIG. 9 is a view showing the contents of a print merchandise DB registration record;

FIG. 14 is a view showing a creator registration window;

FIG. 15 is a view showing an input example on the creator registration window;

FIG. 16 is a view showing the contents of a creator DB registration record;

FIG. 17 is a view showing a creator registration end window;

FIG. 22 is a view showing an input example on the sales merchandise registration window;

FIG. 23 is a view showing a sales merchandise registration result window;

FIG. 24 is a table showing the contents of a sales merchandise registration record;

FIG. 27 is a view showing an order window;

FIG. 28 is a view showing an input example on the order window;

FIG. 29 is a view showing the contents of order DB registration (in adding a cart); and FIG. 30 is a view showing the contents of order DB registration.

DETAILED DESCRIPTION OF THE PREFERRED EMBODIMENT

A preferred embodiment of the present invention will now be described in detail in accordance with the accompanying drawings.

All domain names (FQDN; Fully Qualified Domain Name) used in this embodiment are merely used to identify apparatuses and are irrelevant to really existing domains.

<Overall Configuration of Sales System>

Figure 1:
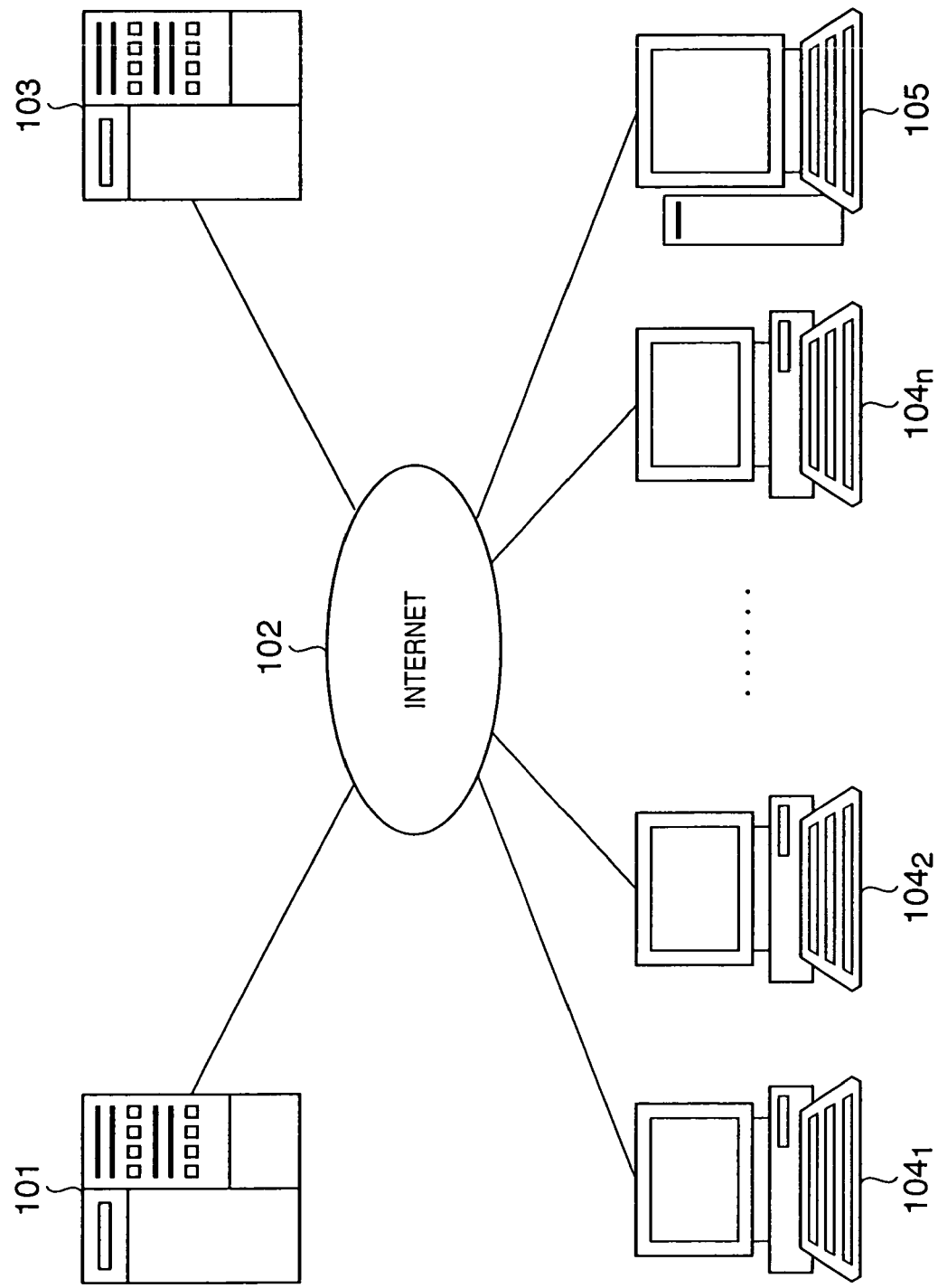
FIG. 1 is a block diagram showing the overall configuration of a sales system.

The overall configuration of a sales system according to this embodiment will be described first with reference to FIG. 1. FIG. 1 is a block diagram showing the configuration of the sales system according to this embodiment.

A support server 101 is installed by a seller who has a capability of producing sales merchandise by printing image data on a variety of print merchandise such as T-shirts and mugs.

A creator server 103 is installed by a creator who holds image data. The creator server 103 provides a sales window to receive orders for sales merchandise from orderers.

Orderer terminals 104(1), 104(2), ..., 104(n) are used by orderers to order sales merchandise.

A creator terminal 105 is used by a creator to create image data or Web page data to provide a sales window or transmit various kinds of information to the support server 101.

The apparatuses 101 and 103 to 105 are computer apparatuses 200 (to be described later) which are connected to Internet 102 through network interfaces 203 to be communicable with each other.

In this embodiment, reference numeral 102 denotes the Internet. However, it may be any other network such as a LAN (Local Area Network) as long as it is a medium capable of data transmission/reception.

Each constituent element of the sales system shown in FIG. 1 will be described next with reference to FIGS. 2 to 7.

<Arrangement of Computer Apparatus>

Figure 2:
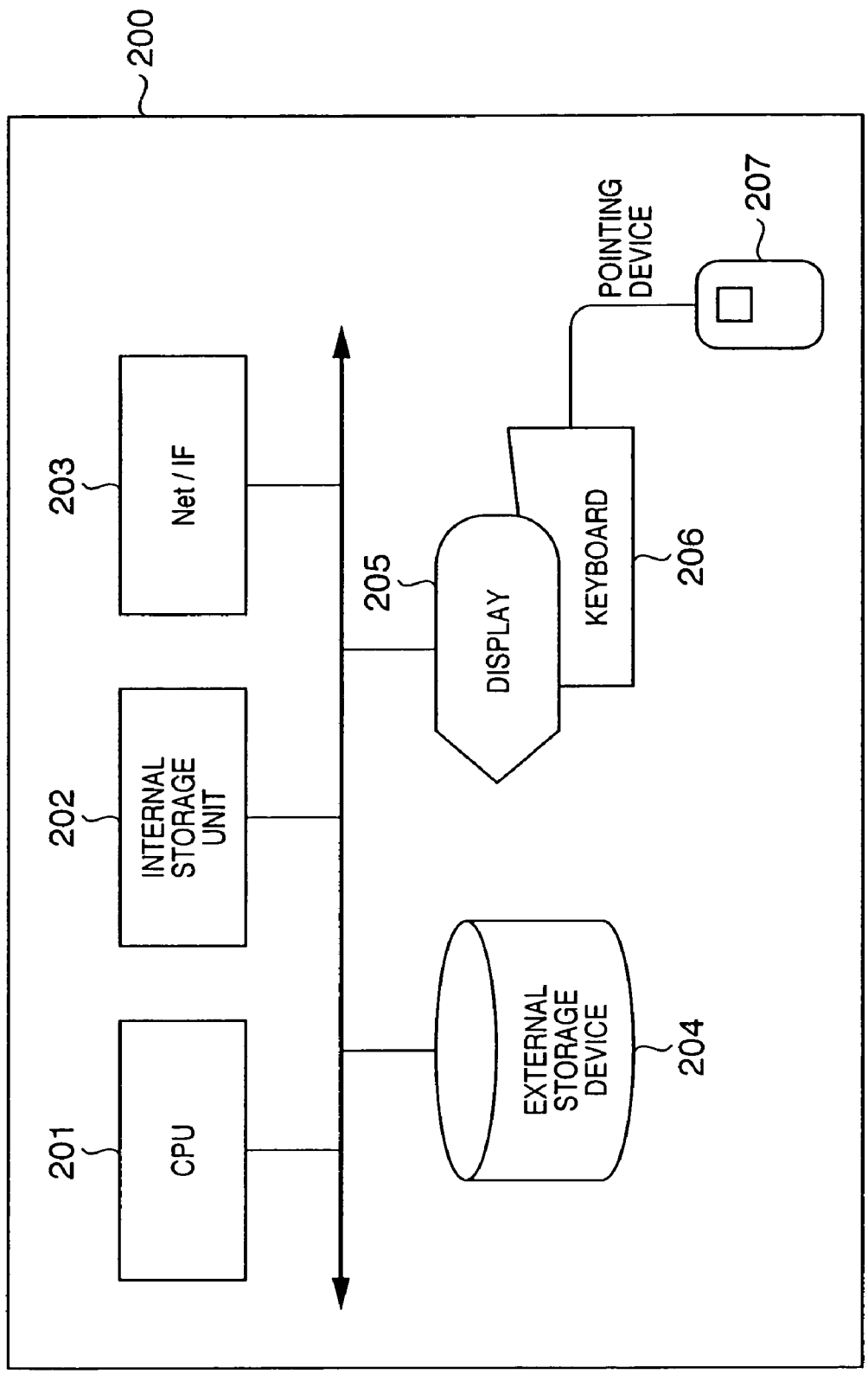
FIG. 2 is a block diagram showing the arrangement of a computer apparatus.

FIG. 2 is a block diagram showing an example of the computer apparatus 200 which constitutes the support server 101, creator server 103, orderer terminal 104, or creator terminal 105.

A CPU (Central Processing Unit) 201 controls the entire computer apparatus 200 in accordance with a control program. An internal storage unit 202 stores the control program executed by the CPU 201, and document data and image data. The internal storage unit 202 includes a RAM (Random Access Memory) or ROM (Read Only Memory). The network interface 203 is connected to the Internet 102 to transmit/receive various kinds of data. An external storage device 204 which stores various kinds of data and files includes a magnetic disk or the like. Reference numeral 205 denotes a display; 206, a keyboard; and 207, a pointing device such as a mouse. The program stored in the internal storage unit 202 is executed, by using the function of an OS (Operating System) which is also stored in the internal storage unit 202, to read/write the contents of data stored in the internal storage unit 202, read/write the contents of a file on the external storage device 204, transmit/receive data through the network interface 203, receive information or an instruction input from the keyboard 206 or pointing device 207, or display various kinds of information or data on the display 205.

The computer apparatus 200 can also have an audio input unit such as a microphone or an image input unit such as a scanner.

The computer apparatus 200 need not always have all the above-described constituent elements. For example, the support server 101 or creator server 103 may omit the display 205 or share the keyboard 206 or pointing device 207 with another computer apparatus 200.

<Module Structure of Support Server>

Figure 3:
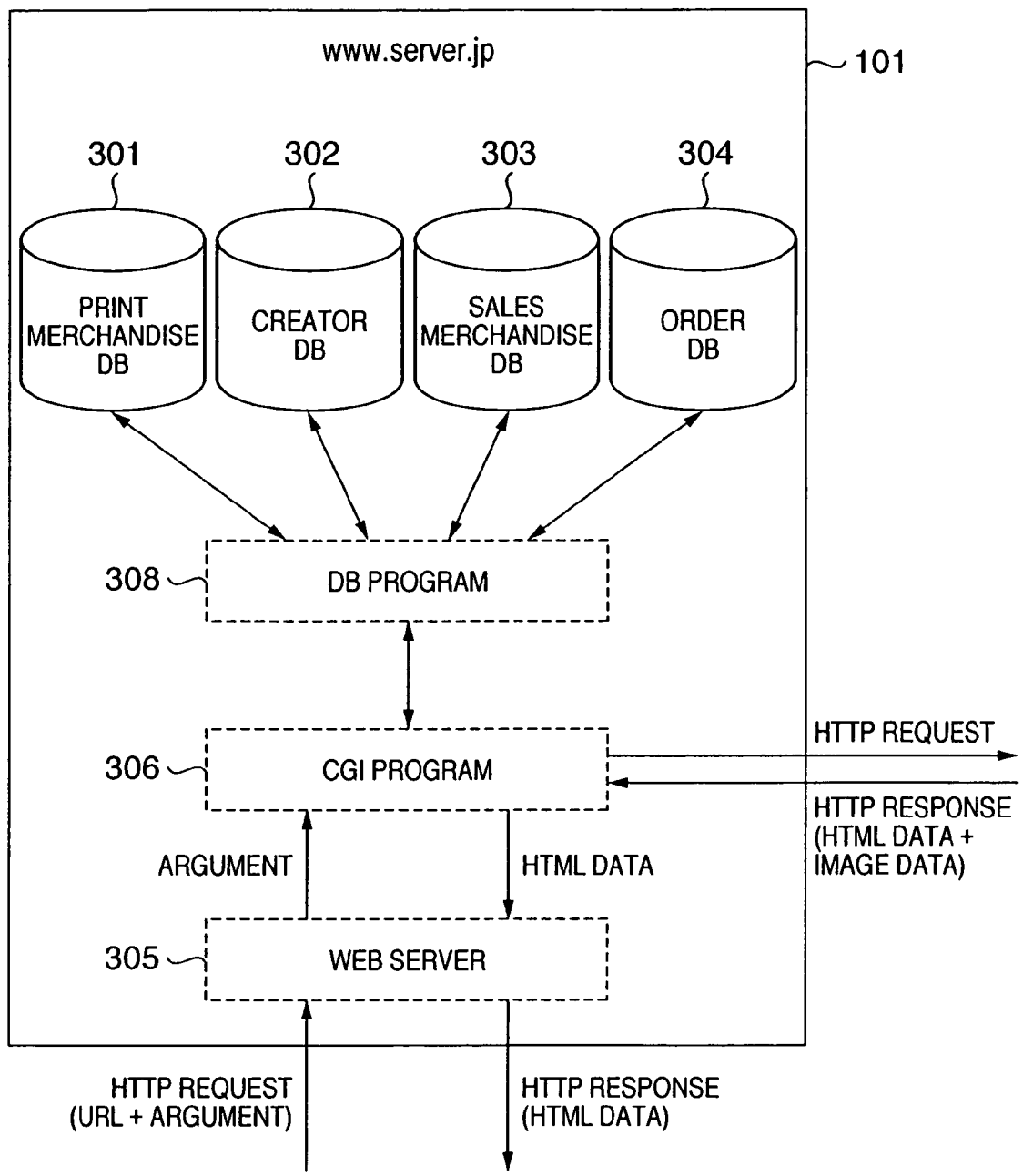
FIG. 3 is a block diagram showing the module structure of a support server.

FIG. 3 is a block diagram showing the module structure of the support server 101 according to this embodiment. The support server 101 includes the computer apparatus 200. The support server 101 is identified on the Internet 102 by a domain name (URL address) "www.server.jp".

Databases 301 to 304 are formed on the external storage device 204 of the support server 101. The databases 301 to 304 are sets of tables which are logically formed by a database program 308 in files on the external storage device 204. The database 301 stores information about print merchandise. The database 302 stores information about creators. The database 303 stores information about sales merchandise produced by printing creators' image data on print merchandise. The database 304 stores information about orders for sales merchandise from orderers. The structures of the databases 301 to 304 will be described later with reference to FIGS. 8, 10, 11, and 12.

The database program 308 is stored in the internal storage unit 202. An arbitrary program stored in the internal storage unit 202 can access a record in each table. "Access" means processing including adding a record to a table, deleting a record from a table, and searching for a record in a table.

A Web server program 305 is stored in the internal storage unit 202. The Web server program receives an HTTP (Hyper Text Transfer Protocol) request from the Internet 102 through the network interface 203 and transmits an HTTP response having HTML (Hyper Text Markup Language) data as a body to the Internet 102.

A CGI (Common Gateway Interface) program 306 is stored in the internal storage unit 202. Each CGI program is identified by a CGI program name. A CGI program is based on a CGI interface and operates to receive the arguments of an HTTP request and output the body of an HTTP response.

A CGI program may be a servlet or a JSP (Java (R) Server Pages) that runs on a J2EE (Java (R) 2 Enterprise Edition) server, an ASP (Active Server Pages) that runs on an IIS (Internet Information Server), or a script written in a script language such as Perl.

An HTTP request has a format including a URL (Uniform Resource Locator) and an argument associated with it. An HTTP request is transmitted from the network interface 203 of the orderer terminal 104 or creator terminal 105 to the support server 101 or creator server 103 through the Internet 102.

A URL is roughly divided into a protocol portion, address portion, and path name portion. For, e.g., a URL "http://www.server.jp/cgi/cbs", the protocol portion is "http://". The address portion is "www.server.jp". The path name portion is "/cgi/cbs". For the accompanying argument, the argument name and its value are paired, like "argument name=value". If there are a plurality of arguments, they are separated by "&". For, e.g., "id=30&pass=XXX", the first argument name is "id", and its value is "30". The second argument name is "pass", and its value is "XXX". The method of designating an argument changes depending on whether the type (method) of an HTTP request is GET or POST. For GET, an argument is designated next to "?" after the URL path name. For POST, an argument is designated in the body of the HTTP request.

HTTP requests are roughly classified into static requests and dynamic requests. For a static request, the Web server program 305 operates to transmit the contents of a file on the external storage device 204 directly as HTML data. The file whose contents should be transmitted is decided by the Web server program 305 in accordance with the path name portion of the URL. On the other hand, for a dynamic request, the Web server program 305 inputs the argument of the HTTP request to the CGI program 306 in accordance with the CGI interface and transmits the output from the CGI program 306 as HTML data. At this time, the Web server program 305 operates such that the CGI program 306 can also acquire elements (e.g., a cookie or information about the HTTP request itself) except the argument of the HTTP request through environment variables or the like. The Web server program 305 identifies on the basis of the path name of a URL whether an HTTP request is static or dynamic. When the path name portion starts with "/cgi/", the HTTP request is a dynamic request. The path name portion after "/cgi/" indicates the CGI program name. For, e.g., the URL "http://www.server.jp/cgi/cbs", the CGI program name is recognized as "cbs".

The CGI program 306 can transmit an HTTP request to the Internet 102 through the network interface 203. The CGI program 306 can also receive HTML data or image data as the body of an HTML response.

<Type of CGI Program and Program Name in Support Server>

FIG. 4 is a table showing the types of CGI programs 306, mapping to URLs, and program names in the support server 101. There are prepared CGIs for creator registration, CGIs for sales merchandise registration, and CGIs for order.

Reference numerals 401 and 402 denote CGIs for creator registration. URLs are "http://www.server.jp/cgi/welcome1" and "http://www.server.jp/cgi/welcome2". Program names are "welcome1" and "welcome2". Reference numerals 403 to 405 denote CGIs for sales merchandise registration. URLs are "http://www.server.jp/cgi/creator1", "http://www.server.jp/cgi/creator2", and "http://www.server.jp/cgi/creator3". Program names are "creator1", "creator2", and "creator3". Reference numerals 406 and 407 denote CGIs for order. URLs are "http://www.server.jp/cgi/order1" and "http://www.server.jp/cgi/order2". Program names are "order1" and "order2".

The operation of each CGI program will be described later in detail with reference to FIGS. 13, 18, and 25.

<Module Structure of Creator Server>

Figure 5:
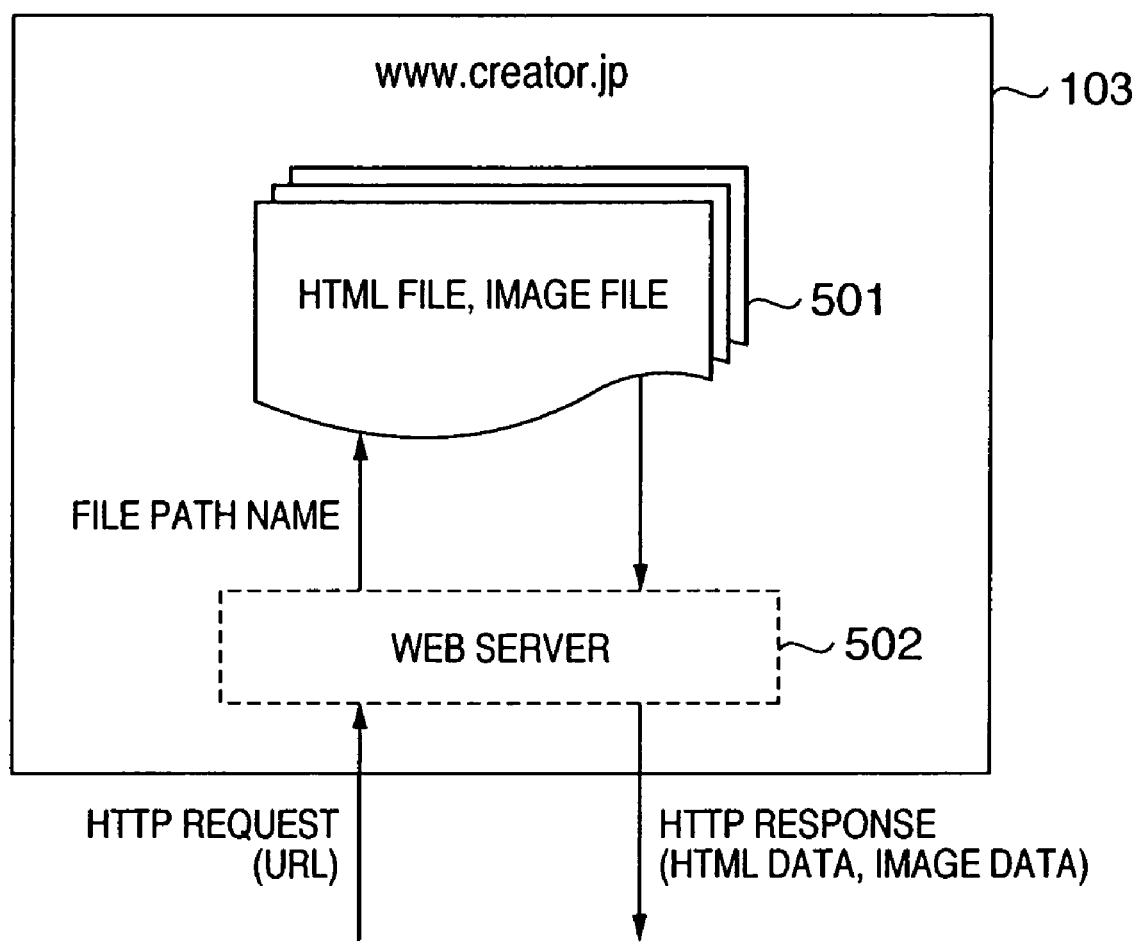
FIG. 5 is a block diagram showing the module structure of a creator server.

FIG. 5 is a block diagram showing the module structure of the creator server 103 according to this embodiment. The creator server 163 includes the computer apparatus 200. The creator server 103 is identified on the Internet 102 by a domain name "www.creator.jp".

Reference numeral 501 denotes files on the external storage device 204 of the creator server 103, and their contents are HTML data, image data, document data, and audio data. The file 501 is uniquely identified on the external storage device 204 by a "file path name".

A Web server program 502 is stored in the internal storage unit 202. The Web server program 502 receives an HTTP request from the Internet 102 through the network interface 203 and transmits an HTTP response having HTML data as a body to the Internet 102. The Web server program 502 receives only static HTTP requests. The Web server program 502 maps the path name portion in the URL of an HTTP request to a file path name, refers to the file 501 having the requested file path name for the external storage device 204, and uses its contents as a body.

<Files in Creator Server>

FIG. 6 is a table showing mapping between URLs and path names of the files 501, and the types and contents of the files in the creator server 103. There are prepared print image files, thumbnail image files, and an HTML file. Reference numerals 601 and 602 denote information about print image files; 603 and 604, information about thumbnail image files corresponding to the print image files 601 and 602; and 605, information about the HTML file.

When the Web server program 502 receives an HTTP request containing a URL "http://www.creator.jp/images/image1.jpg" as indicated by 601, the path name portion of the URL, "/images/image1.jpg" is mapped to the file path name of the file 501, "/var/www/images/image1.jpg". As the contents of the print image file 601, the image size is 1,200 pixels (height)×800 pixels (width). This processing also applies to the print image file 602.

When the Web server program 502 receives an HTTP request containing a URL "http://www.creator.jp/thumb/thumb1.jpg" as indicated by 603, the path name portion of the URL, "/thumb/thumb1.jpg" is mapped to the file path name of the file 501, "/var/www/thumbs/thumb1.jpg". The thumbnail image file 603 corresponds to the print image file 601 and therefore has the same aspect ratio as that of the print image file 601. The image size of the thumbnail image file 603 is 60 pixels (height)×40 pixels (width). This processing also applies to the thumbnail image file 604.

Reference numeral 605 denotes an HTML file. The Web server program 502 maps the path name portion "/html/order.html" of a URL "http://www.creator.jp/html/order.html" to a file path name "/var/www/html/order.html". The contents of the HTML file 605 will be described later with reference to FIG. 26.

<Module Structure of Orderer Terminal/Creator Terminal>

Figure 7:
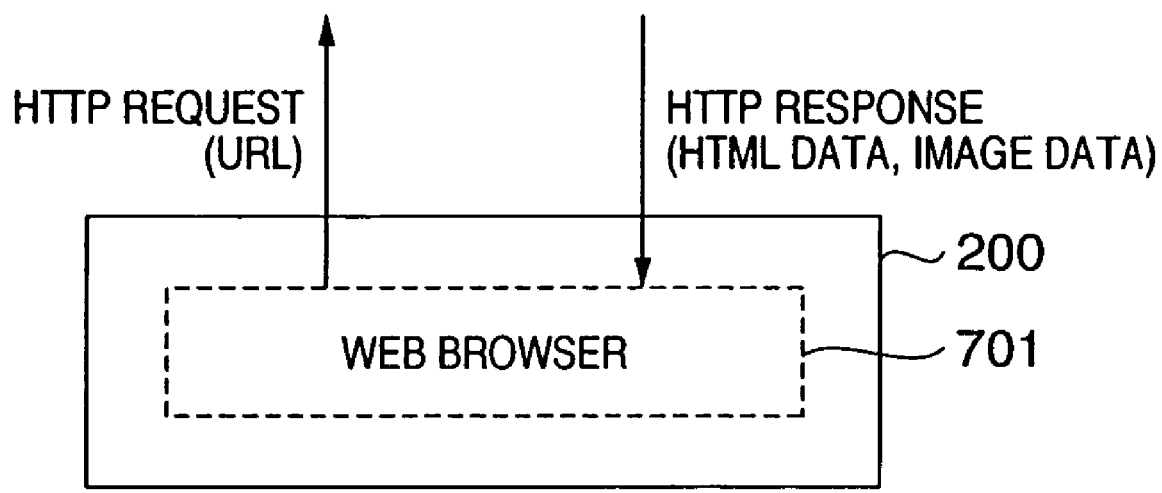
FIG. 7 is a block diagram showing the module structure of an orderer terminal/creator terminal.

FIG. 7 is a block diagram showing the module structure of the orderer terminal 104 and creator terminal 105 according to this embodiment. Each of the orderer terminal 104 and creator terminal 105 includes the computer apparatus 200.

A Web browser program 701 is stored in the internal storage unit 202. When an orderer or creator inputs the URL of information to be browsed to the Web browser 701 by using the keyboard 206 or pointing device 207, an HTTP request containing the input URL is transmitted to the Internet 102 through the network interface 203. Synchronized with transmission of the HTTP request, the Web browser 701 receives an HTTP response corresponding to it from the Internet 102 through the network interface 203. The Web browser 701 can render, on the display 205, HTML data or image data as the body portion of the received HTTP response.

For HTML data, the Web browser 701 executes lexical and syntactic analysis of the HTML data in accordance with rules defined by W3C (World Wide Web Consortium). For image data, the Web browser 701 analyzes the image data in accordance with the image data format.

<Database>

The record structures of the databases 301 to 304 used in this embodiment will be described next with reference to FIGS. 8 to 12.

<Print Merchandise Database>

Figure 8:
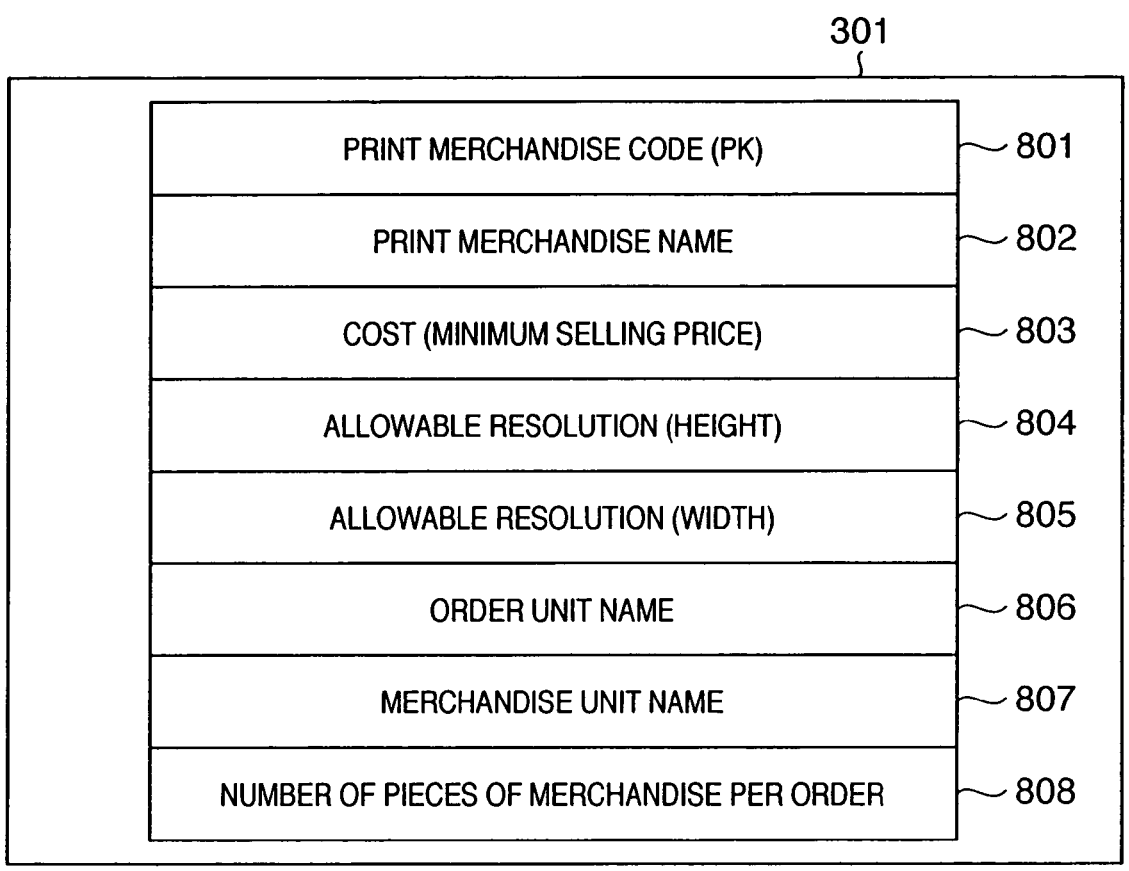
FIG. 8 is a view showing the structure of a print merchandise DB table.

FIG. 8 is a view showing the record structure of the print merchandise database 301 which stores information about print merchandise such as print media on which creators' image data should be printed.

Reference numeral 801 denotes a print merchandise code. The print merchandise code 801 is a code to uniquely identify print merchandise. The print merchandise code 801 is designated to PK (Primary Key) to avoid duplication between records in the print merchandise database 301.

Reference numeral 802 denotes a print merchandise name. Examples are A4 paper, 127×89 mm pro photo paper, postcards, mugs, and T-shirts.

Reference numeral 803 denotes a cost (minimum selling price). This is the cost necessary for the seller for printing image data on print merchandise. The unit is "yen".

Reference numerals 804 and 805 denote allowable resolutions of image data to be printed on print merchandise. They are resolutions requested by the seller. The allowable resolutions 804 and 805 respectively represent the height and width of the allowable resolution. The unit is "pixels".

Reference numeral 806 denotes an order unit name 806 of sales merchandise. Reference numeral 807 denotes a merchandise unit name 807 of sales merchandise. Reference numeral 808 denotes the quantity of merchandise per order.

For example, assume that the seller wants to sell mugs on a one-by-one basis and postcards in sets of five. A person can give an order for even one mug. The order unit is desirably called a "set". On the other hand, a person can order postcards in sets of five. The order unit is called an "assortment". In this case, "mug" is stored in the print merchandise name 802, "set" is stored in the order unit name 806, "piece" is stored in the merchandise unit name, and "1" is stored in the number of pieces of merchandise per order. In addition, "postcard" is stored in the print merchandise name 802, "assortment" is stored in the order unit name 806, "sheet" is stored in the merchandise unit name, and "5" is stored in the number of pieces of merchandise per order.

FIG. 9 shows an example of the contents of a record registered in the print merchandise database 301 according to this embodiment.

In a print merchandise record 901, "TS-W-S" is stored in the print merchandise code 801, "T-shirt (white) S size" is stored in the print merchandise name 802, "3000" is stored in the cost (minimum selling price) 803, "1200" is stored in the allowable resolution (height) 804, "800" is stored in the allowable resolution (width) 805, "set" is stored in the order unit name 806, "piece" is stored in the merchandise unit name, and "1" is stored in the number 808 of pieces of merchandise per order. Pieces of information similar to the print merchandise record 901 are stored in print merchandise records 902 to 908.

<Creator Database>

Figure 10:
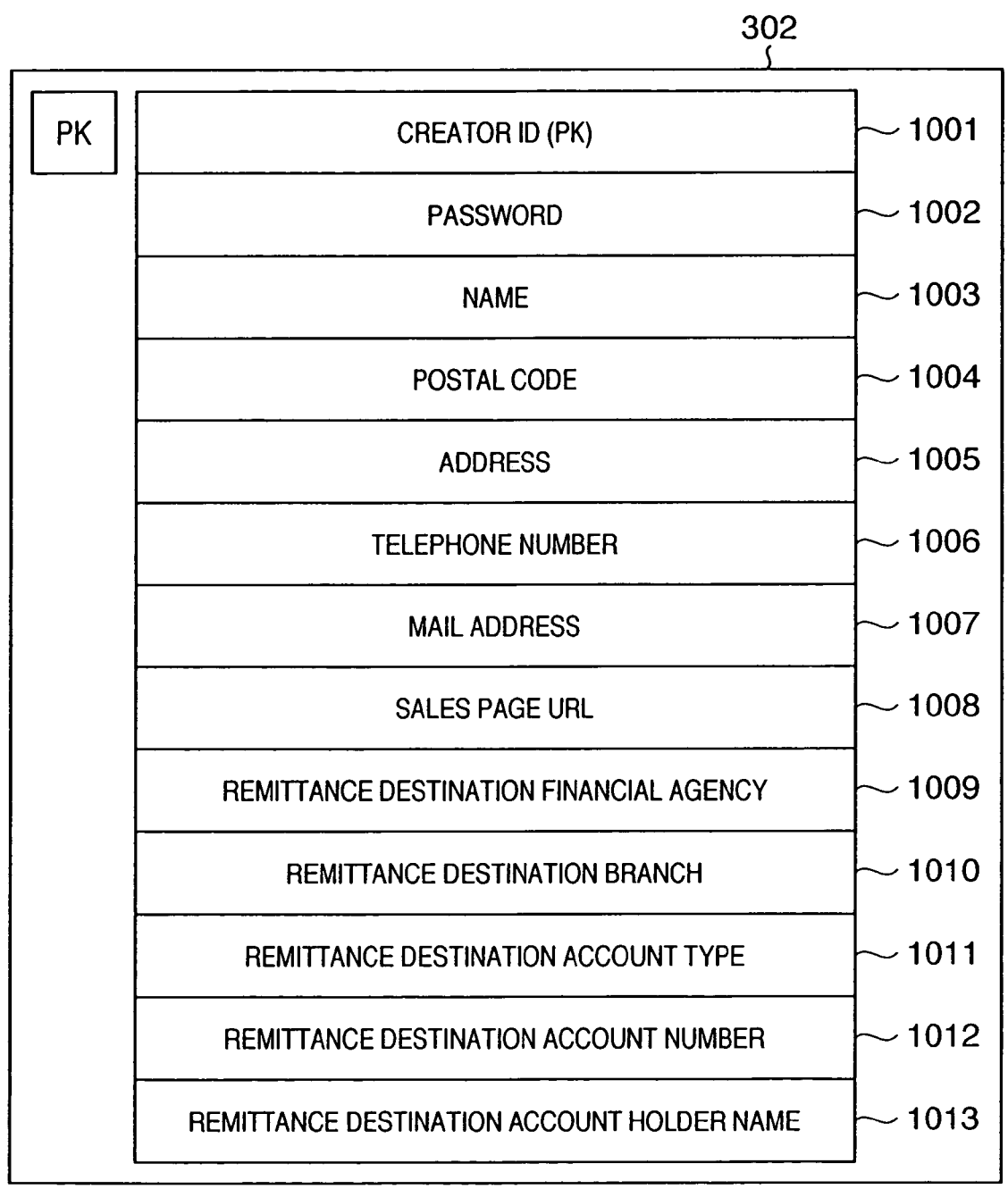
FIG. 10 is a view showing the structure of a creator DB table.

FIG. 10 is a view showing the record structure of the creator database 302 which stores information about creators who provide image data to be printed on print merchandise.

A creator ID 1001 is a code to uniquely identify a creator. The creator ID 1001 is designated to PK to avoid duplication between records in the creator database 302.

A password 1002 is used to authenticate the creator. Reference numerals 1003 to 1007 denote a name, postal code, address, telephone number, and email address of the creator, respectively. Reference numeral 1008 denotes a URL of a Web page provided by the creator. When an orderer accesses the URL address through the Internet 102 from the orderer terminal 104, a sales window is displayed on the display of the orderer terminal 104. Reference numerals 1009 to 1013 denote a remittance destination financial agency, remittance destination branch, remittance destination account type, remittance destination account number, and remittance destination account holder name, respectively, necessary for the creator for receiving payment for sales merchandise.

Registration in the fields 1001 to 1013 of the creator record will be described later with reference to FIG. 13.

<Sales Merchandise Database>

Figure 11:
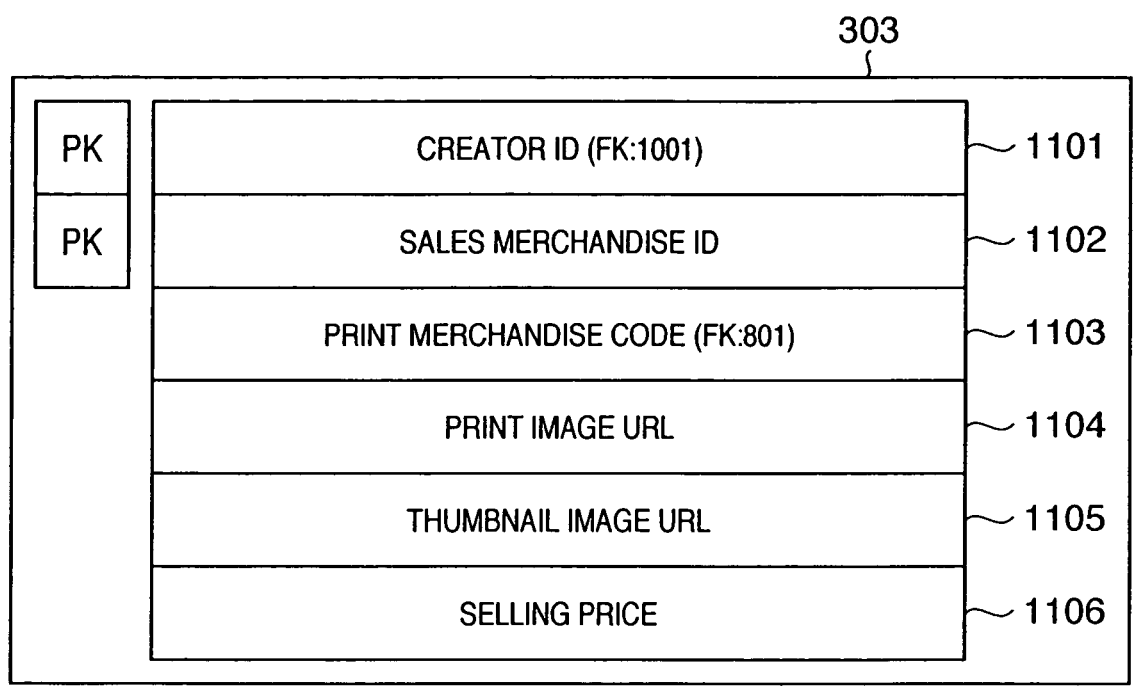
FIG. 11 is a view showing the structure of a sales merchandise DB table.

FIG. 11 is a view showing the record structure of the sales merchandise database 303 which stores information about sales merchandise to be sold by creators.

The creator ID of a creator who has registered sales merchandise is stored in a field 1101. The creator ID 1101 is stored by referring to the creator ID 1001 in the creator database 302 and therefore designated to FK (Foreign Key).

A unique code to identify sales merchandise for each creator is stored in a field 1102. The combination of the creator ID 1101 and sales merchandise ID 1102 is designated to PK to avoid duplication of the sales merchandise ID 1102 between records in the sales merchandise database 303.

Pieces of information about sales merchandise are stored in fields 1103 to 1106. Pieces of information designated by the creator at the time of sales merchandise registration (to be described later with reference to FIG. 18) are stored.

A print merchandise code is stored in the field 1103. The print merchandise code is stored by referring to the print merchandise code 801 in the print merchandise database 301 and therefore designated to FK. A URL to be used to access a print image is stored in the field 1104. A URL to be used to access the thumbnail image of the print image is stored in the field 1105. The price of sales merchandise is stored in the field 1106.

<Order Database>

Figure 12:
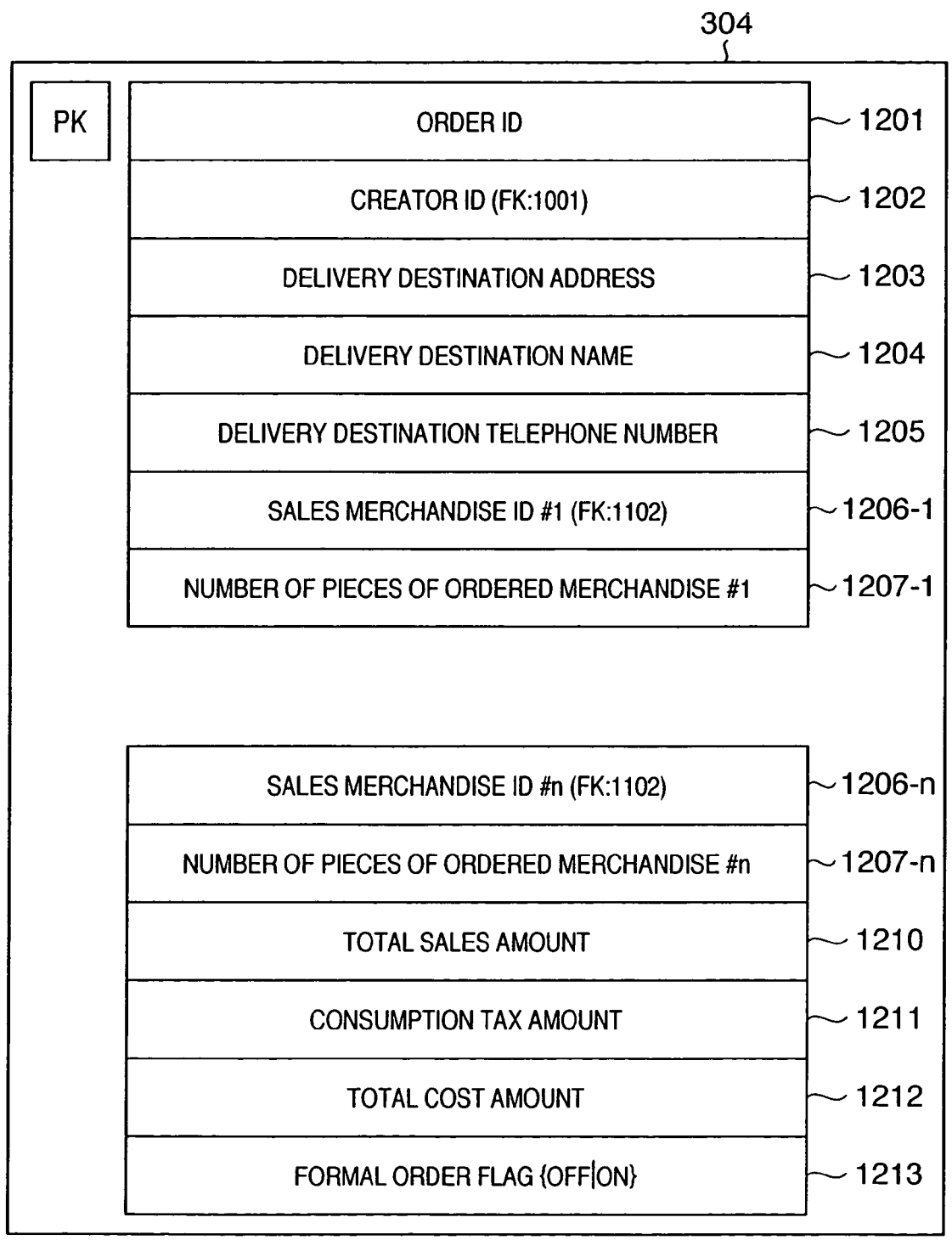
FIG. 12 is a view showing the structure of an order DB table.

FIG. 12 is a view showing the record structure of the order database 304 which stores information about orderers.

An order ID is stored in a field 1201. The order ID is a unique code to identify an order. The order ID 1201 is designated to PK to avoid duplication between records in the order database 304.

The creator ID of ordered sales merchandise is stored in a field 1202. The creator ID 1202 is stored by referring to the creator ID 1001 in the creator database 302 and therefore designated to FK.

Pieces of information designated by the orderer at the time of sales merchandise order (to be described later with reference to FIG. 25) are registered in fields 1203 to 1205. The address of a sales merchandise delivery destination is stored in the field 1203. The name of the sales merchandise delivery destination is stored in the field 1204. The telephone number of the sales merchandise delivery destination is stored in the field 1205.

Pieces of information about sales merchandise ordered by the orderer are stored in fields 1206 and 1207. The merchandise ID of ordered sales merchandise is stored in the field 1206. The merchandise ID is stored by referring to the sales merchandise ID (1102) in the sales merchandise database 303, which is registered by the creator, and therefore designated to FK. The number of pieces of ordered sales merchandise is stored in the field 1207.

An arbitrary number of fields can be added to the sales merchandise ID 1206 and the number 1207 of pieces of ordered merchandise. FIG. 12 shows nth fields 1206-n and 1207-n.

The total amount of the ordered sales merchandise is stored in a field 1210. The selling price 1106 of each piece of sales merchandise is acquired by referring to the records in the sales merchandise database 303 by using the sales merchandise IDs 1206-1 to 1206-n as a key. The product of each selling price 1106 and a corresponding one of the numbers 1207-1 to 1207-n of pieces of ordered merchandise is obtained. The sum of the products is calculated and stored in the total sales amount 1210.

Reference numeral 1211 denotes a consumption tax amount. A value obtained by multiplying the total sales amount 1210 by the consumption tax rate (5% in this embodiment) is stored.

The sum of the total sales amount 1210 and consumption tax amount 1211 is the amount charged for the contents ordered by the orderer.

A total cost amount is stored in a field 1212. The print merchandise codes 1103 are acquired by referring to the sales merchandise database 303 by using the sales merchandise IDs 1206-1 to 1206-n as a key. The costs (minimum selling prices) 803 are acquired by referring to the print merchandise database 301 by using the print merchandise codes 1103 as a key. The product of each cost (minimum selling price) 803 and a corresponding one of the numbers 1207-1 to 1207-n of pieces of ordered merchandise is obtained. The sum of the products is calculated and stored in the total cost amount 1212.

Reference numeral 1213 denotes a formal order flag which represents whether the order has been concluded. The formal order flag 1213 is set to "ON" or "OFF". Before the order is concluded by the orderer's operation, the formal order flag 1213 is "OFF". When the order is established by the orderer's operation, the formal order flag 1213 is set to "ON".

<Creator Registration>

Processing for causing a creator to execute online registration in the support server 101 according to this embodiment will be described next in detail with reference to FIGS. 13 to 17.

Figure 13:
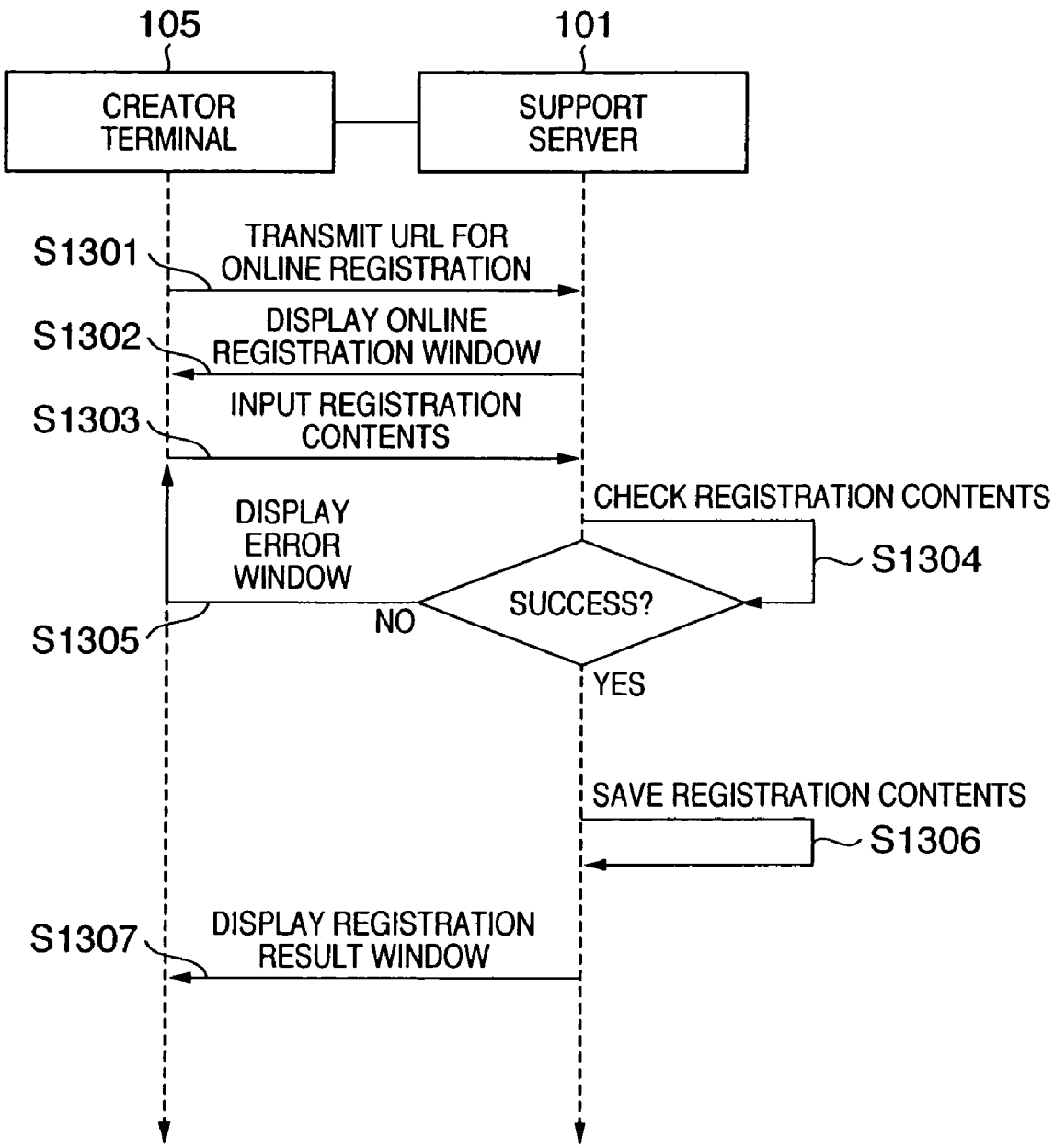
FIG. 13 is a sequence chart showing the sequence of creator registration.

FIG. 13 is a sequence chart showing the sequence of creator registration processing.

Step S1301:

The creator instructs browsing of a creator registration page by inputting a creator registration window display URL "http://www.server.jp/cgi/welcome1" (401 in FIG. 4) to the Web browser 701 of the creator terminal 105 by using the keyboard 206 or pointing device 207. The Web browser 701 transmits an HTTP request containing the creator registration window display URL to the Internet 102. The Web server 305 of the support server 101 receives the HTTP request through the Internet 102. The Web server 305 maps "welcome1" as the CGI program 306 for the creator registration window display URL (401 in FIG. 4).

Step S1302:

The Web server 305 inputs the argument of the HTTP request to the mapped CGI program "welcome1". In this case, the argument is null. The CGI program "welcome1" outputs HTML data representing the creator registration window. The Web server 305 of the support server 101 transmits an HTTP response having the HTML data as a body to the Internet 102. The Web browser 701 of the creator terminal 105 receives the HTTP response through the Internet 102 and renders, on the display 205, the creator registration window display HTML data as the body portion of the HTTP response.

FIG. 14 shows a state wherein rendering is ended. A creator registration window 1400 is formed by using the form function of HTML. When the form is used, the transmission destination URL and argument of the HTTP request can be designated. In this example, a creator registration content input URL "http://www.server.jp/cgi/welcome2" (402 in FIG. 4) is designated as the URL. Fields 1401 to 1413 are used to input or select information about the creator. These fields are used to designate the arguments of the HTTP request. The creator ID is input to the field 1401. The password to be used by the creator in logging in to the support server is input to the field 1402. The name of the creator is input to the field 1403. The postal code of the creator is input to the field 1404. The address of the creator is input to the field 1405. The telephone number of the creator is input to the field 1406. The email address of the creator is input to the field 1407. The URL of the sales homepage provided by the creator is input to the field 1408. The remittance destination financial agency of the creator is input to the field 1409. The remittance destination branch of the creator is input to the field 1410. The remittance destination account type of the creator is input to the field 1411. The remittance destination account number of the creator is input to the field 1412. The remittance destination account holder name of the creator is input to the field 1413. The field of the remittance destination account type 1411 is a selection field while the remaining fields are input fields.

Step S1303:

The creator inputs or selects information in the input or selection fields 1401 to 1413 on the creator registration window 1400 displayed on the Web browser 701 of the creator terminal 105 by using the keyboard 206 or pointing device 207.

FIG. 15 shows an example wherein input and selection by the creator have been done. Information in a password input field 1502 is displayed as "***". This is because the input contents are not echoed back to the display 205 for the sake of confidentiality. Actually, "XXX" is input. Even for the argument of the HTTP request corresponding to the input field 1502, not "*" but "XXX" is transmitted.

A sales page prepared by the creator server 103 is input to an input field 1508. The URL mapped to the HTML file 605 shown in FIG. 6 is designated.

When the creator executes input or selection processing and clicks on an OK button 1514 by using the keyboard 206 or pointing device 207, the Web browser 701 transmits, to the Internet 102, an HTTP request containing the creator registration content input URL "http://www.server.jp/cgi/welcome2" (402 in FIG. 4) and contents shown in fields 1501 to 1513 as arguments. The Web server 305 of the support server 101 receives the HTTP request through the Internet 102 and maps "welcome2" as the CGI program 306 corresponding to the creator registration content input URL (402 in FIG. 4).

Step S1304:

The Web server 305 inputs the arguments of the HTTP request to the mapped CGI program "welcome2". As described above, the arguments are the contents input or selected in the fields 1501 to 1513 shown in FIG. 15. The CGI program "welcome2" checks the arguments before processing.

It is checked first whether the creator ID 1501 is not null. If the creator ID 1501 is null, it is determined that an error has occurred, and the processing advances to step S1305.

If the creator ID 1501 is not null, the database program 308 is instructed to search for a record in the creator database 302 by using the creator ID 1501 as a key. As shown in FIG. 10, the creator ID 1001 in the creator database 302 is PK. For this reason, the creator ID cannot be duplicated between a plurality of records. If such a record is found as a result of search, it is determined that an error has occurred, and the processing advances to step S1305.

If no record is found as a result of search, the processing advances to step S1306.

Other information may also be checked in step S1304. For example, it may be checked whether the postal code 1504 or address 1505 really exists. The number of digits, area code, and central office code of the telephone number 1506, the format and reachability of the mail address 1507, and the format and reachability of the sales page URL 1508 may be checked. It may also be checked whether the remittance destination financial agency really exists. In addition, the number of digits of the remittance destination account number 1512 may be checked.

Step S1305:

If the result of HTTP request argument check by the CGI program "welcome2" in step S1304 indicates an error, the CGI program "welcome2" outputs HTML data representing an error window.

The Web server 305 of the support server 101 transmits an HTTP response having error window display HTML data as a body to the Internet 102. The Web browser 701 of the creator terminal 105 receives the HTTP response through the Internet 102 and renders, on the display 205, the error window display HTML data as the body portion of the HTTP response.

In the rendered state, a message representing the error contents is additionally displayed on the creator registration content input window shown in FIG. 15.

Step S1306:

If HTTP request argument check by the CGI program "welcome2" has successfully be done in step S1304, the CGI program "welcome2" subsequently executes registration processing of creator information designated by the arguments.

First, the CGI program "welcome2" instructs the database program 308 to add a new record to the creator database 302. As described above, the creator database 302 has the record structure shown in FIG. 10. The input value in the field 1501 is registered in the creator ID 1001. The input value in the field 1502 is registered in the password 1002. The input value in the field 1503 is registered in the name 1003. The input value in the field 1504 is registered in the postal code 1004. The input value in the field 1505 is registered in the address 1005. The input value in the field 1506 is registered in the telephone number 1006. The input value in the field 1507 is registered in the mail address 1007. The input value in the field 1508 is registered in the sales page URL 1008. The input value in the field 1509 is registered in the remittance destination financial agency 1009. The input value in the field 1510 is registered in the remittance destination branch 1010. The selected value in the field 1511 is registered in the remittance destination account type 1011. The input value in the field 1512 is registered in the remittance destination account number 1012. The input value in the field 1513 is registered in the remittance destination holder name 1013. FIG. 16 shows the contents of the registered record.

Step S1307:

When record registration in the creator database 302 is ended, the CGI program "welcome2" outputs HTML data representing a creator registration end window. The Web server 305 of the support server 101 transmits an HTTP response having the creator registration end window display HTML data as a body to the Internet 102. The Web browser 701 of the creator terminal 105 receives the HTTP response through the Internet 102 and renders the HTML data on the display 205.

FIG. 17 shows a state wherein rendering is ended. In a creator registration end window 1700, a sales merchandise registration URL 1701 is displayed to cause the creator to subsequently register sales merchandise after input of various kinds of information. The sales merchandise registration URL 1701 is the URL of the CGI that the support server 101 prepares for sales merchandise registration of the creator. The sales merchandise registration URL 1701 equals the URL 403 shown in FIG. 4.

<Sales Merchandise Registration>

Sales merchandise registration by the registered creator in the support server 101 according to this embodiment will be described next in detail with reference to FIGS. 18 to 23.

Figure 18:
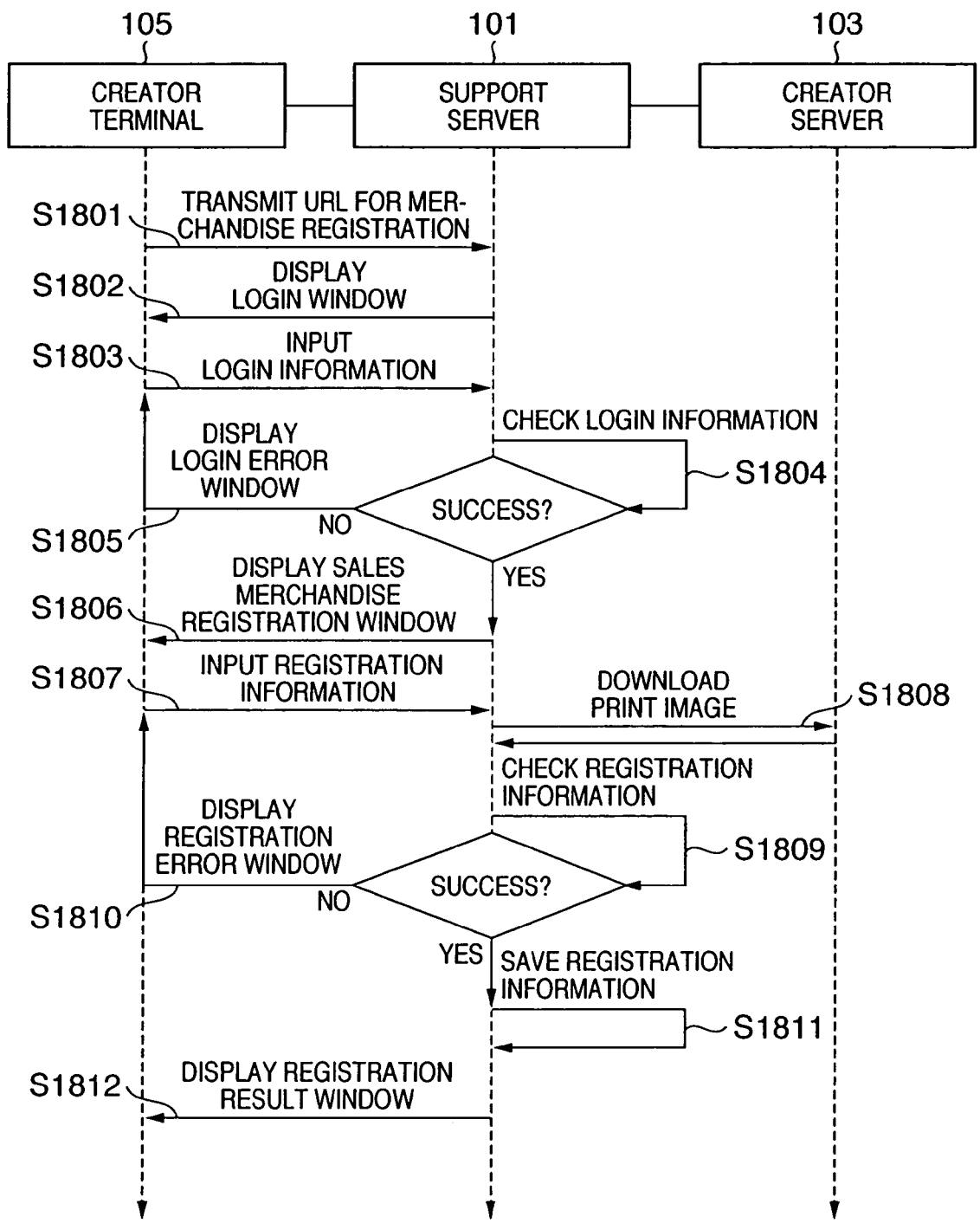
FIG. 18 is a sequence chart showing the sequence of sales merchandise registration.

FIG. 18 is a sequence chart showing the sequence of sales merchandise registration.

Step S1801:

The creator instructs the Web browser 701 of the creator terminal 105 to browse the sales merchandise registration URL "http://www.server.jp/cgi/creator1" (403 in FIGS. 4 and 1701 in FIG. 17) by using the keyboard 206 or pointing device 207. The Web browser 701 transmits an HTTP request containing the sales merchandise registration URL to the Internet 102. The Web server 305 of the support server 101 receives the HTTP request through the Internet 102 and maps "creator1" as the CGI program 306 for the sales merchandise registration URL (403 in FIG. 4).

Step S1802:

The Web server 305 inputs the argument of the HTTP request to the mapped CGI program "creator1". In this case, the argument is null. The CGI program "creator1" outputs HTML data representing a creator login window. The Web server 305 transmits an HTTP response having the creator login window display HTML data as a body to the Internet 102. The Web browser 701 of the creator terminal 105 receives the HTTP response through the Internet 102 and renders, on the display 205, the creator login window display HTML data as the body portion of the HTTP response.

Figure 19:
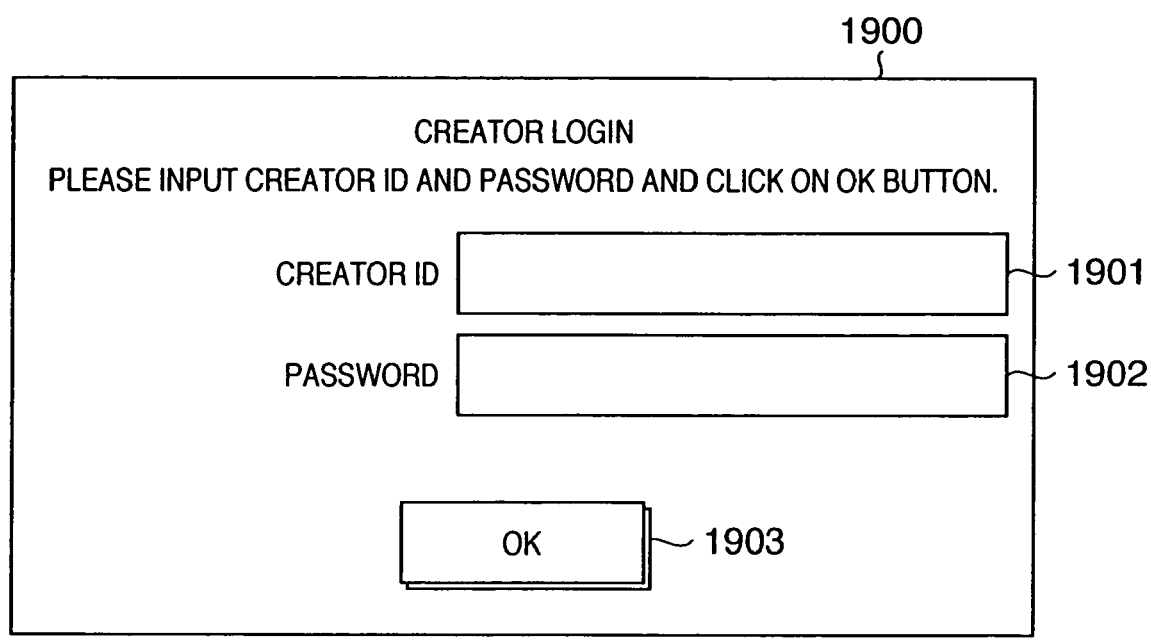
FIG. 19 is a view showing a creator registration login window.

FIG. 19 shows a state wherein rendering is ended. A creator login window 1900 is formed by using the form function of HTML. In this example, a creator login processing URL "http://www.server.jp/cgi/creator2" (404 in FIG. 4) is designated as the HTTP request transmission destination URL. Input fields 1901 and 1902 are used to designate the arguments of the HTTP request.

Step S1803:

The creator executes the input operation on the creator login window 1900 displayed on the Web browser 701 of the creator terminal 105 by using the keyboard 206 or pointing device 207.

Figure 20:
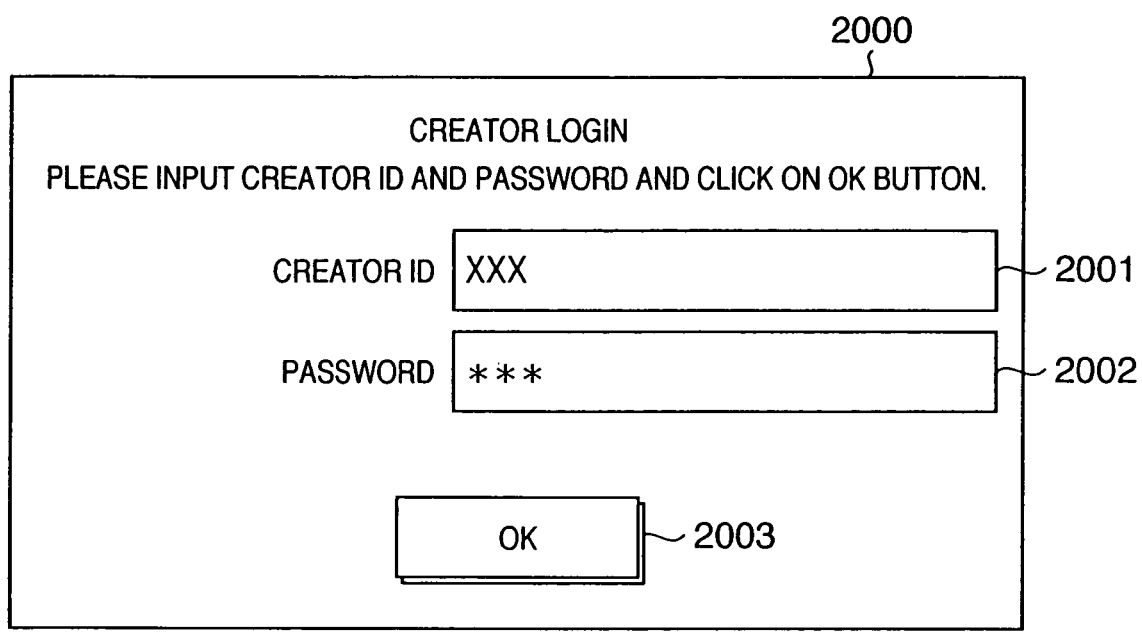
FIG. 20 is a view showing an input example on the creator registration login window.

FIG. 20 shows an example wherein input has been done. Information in a password input field 2002 is displayed as "***". This is because the input contents are not echoed back to the display 205 for the sake of confidentiality. Actually, "XXX" is input. Even for the argument of the HTTP request corresponding to the input field 2002, not "*" but "XXX" is transmitted.

When the creator clicks on an OK button 2003 by using the keyboard 206 or pointing device 207, the Web browser 701 of the creator terminal 105 transmits, to the Internet 102, an HTTP request containing the creator login processing URL "http://www.server.jp/cgi/creator2" (404 in FIG. 4) and character strings input in a field 2001 and a field 2002 as arguments. The Web server 305 of the support server 101 receives the HTTP request through the Internet 102 and maps "creator2" as the CGI program 306 corresponding to the creator login processing URL (404 in FIG. 4).

Step S1804:

The Web server 305 inputs the arguments of the HTTP request to the mapped CGI program "creator2". In this case, "XXX" is input as the creator ID, and "XXX" is input as the password. The CGI program "creator2" checks the arguments.

The CGI program "creator2" checks first whether at least one of the creator ID and password as the arguments is not null. If one of the arguments is null, it is determined that an error has occurred, and the processing advances to step S1805.

Next, the CGI program "creator2" instructs the database program 308 to search for a record in the creator database 302 by using the creator ID of the argument as a key. If no record is found, it is determined that an error has occurred, and the processing advances to step S1805.

Finally, the CGI program "creator2" compares the password 1002 of the found record with the password of the argument. If they do not coincide, it is determined that an error has occurred, and the processing advances to step S1805.

As shown in FIG. 10, since the creator ID 1001 in the creator database 302 is PK, only one record is present at most. If a record is found, and the passwords coincide, check is successfully done.

In this embodiment, since only one record has the creator ID "XXX" and password "XXX", as shown in FIG. 16, check is successfully done. If check has successfully be done, the processing advances to step S1806.

Whether at least one of the creator ID and password is not null may be checked by using a script described by JavaScript or the like in the HTML data that forms the creator login window shown in FIGS. 19 and 20. In this case, check is done by the Web browser 701 of the creator terminal 105. Hence, if an argument is null, communication in step S1803 or S1805 can be omitted. Even in this case, however, it is normally checked also in step S1804 whether an argument is null to prevent any operation error caused when the CGI program receives a malicious HTTP request with altered arguments. Even in other cases, the above processing can similarly be applied to cause the CGI program to check whether an argument is null.

Step S1805:

If an error is detected by the HTTP request argument check by the CGI program "creator2" in step S1804, the CGI program "creator2" outputs HTML data representing an error window. The Web server 305 transmits, to the Internet 102, an HTTP response having error window display HTML data as a body. The Web browser 701 of the creator terminal 105 receives the HTTP response through the Internet 102 and renders, on the display 205, the creator login window display HTML data as the body portion of the HTTP response.

In the rendered state, a message representing the error contents is additionally displayed on the creator login window shown in FIG. 20.

Step S1806:

If HTTP request argument check by the CGI program "creator2" has successfully be done in step S1804, the CGI program "creator2" outputs HTML data representing a sales merchandise registration window. The Web server 305 transmits an HTTP response containing the sales merchandise registration window display HTML data to the Internet 102. The Web browser 701 of the creator terminal 105 receives the HTTP response through the Internet 102 and renders the HTML data on the display 205 of the creator terminal 105.

Figure 21:
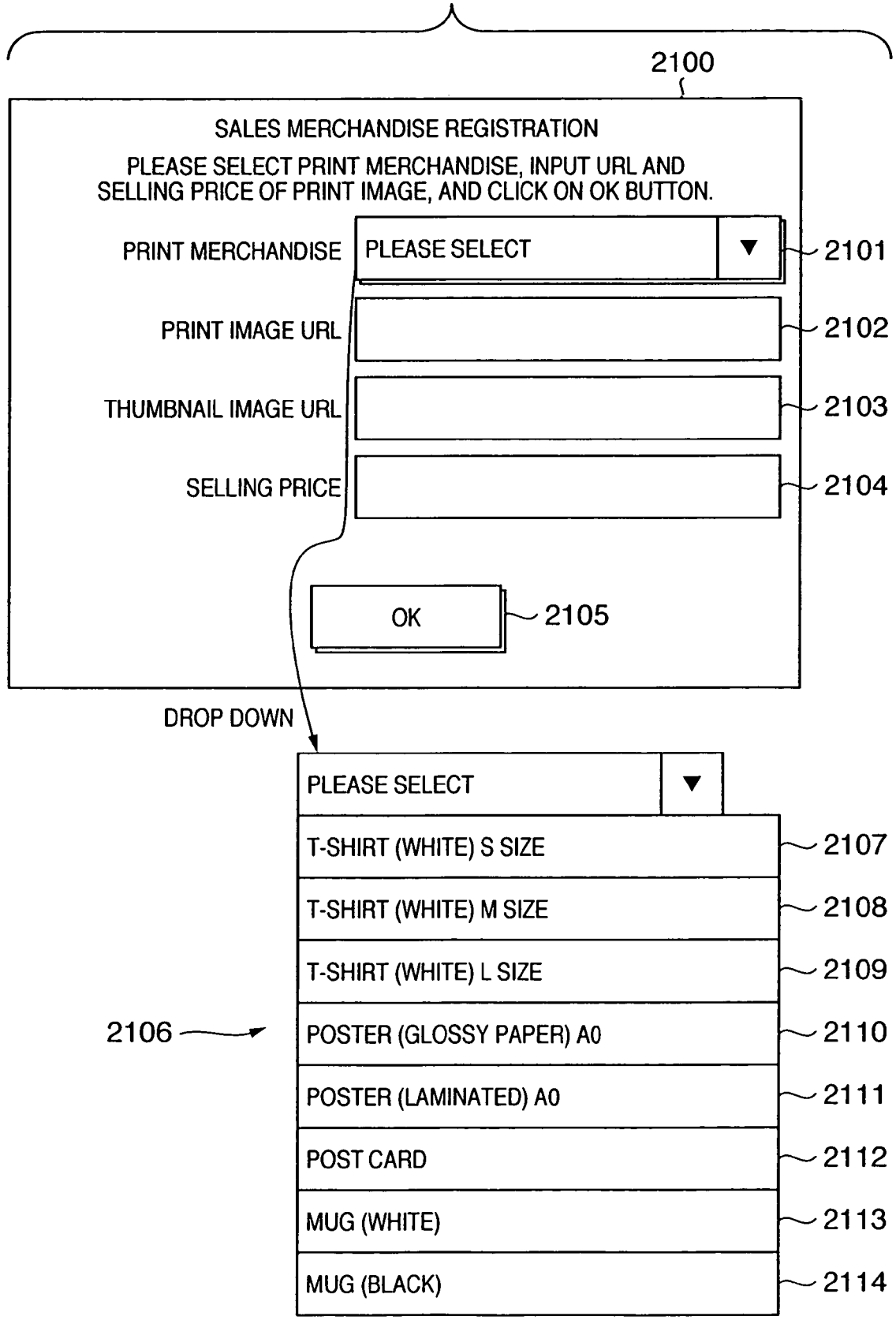
FIG. 21 is a view showing a sales merchandise registration window.

FIG. 21 shows a state wherein rendering is ended. The sales merchandise registration window is formed by using the form function of HTML. In this example, a sales merchandise registration processing URL "http://www.server.jp/cgi/creator3" (405 in FIG. 4) is designated as the HTTP request transmission destination URL.

Reference numeral 2101 denotes a print merchandise selection field 2101. When the creator opens the drop-down menu by using the keyboard 206 or pointing device 207, one of pieces of print merchandise (FIG. 9) registered in the print merchandise database 301 can be selected, as indicated by 2106. At this time, in outputting the HTML data, the CGI program "creator2" accesses the print merchandise database 301 through the database program 308, acquires a list of registered print merchandise (FIG. 9), and generates the SELECT statement in the form function of HTML by using the print merchandise list. In the SELECT statement, the selection items are expressed by a list of OPTION statements. In an OPTION statement, a character string sent as an argument of an HTTP request is designated by a VALUE attribute, and a display character string to be rendered on the display 205 is designated by a value. In this example, the print merchandise code 801 in the print merchandise database 301 is used as an argument. The print merchandise name 802 in the print merchandise database 301 is used as a display character string. On the basis of the print merchandise list shown in FIG. 9, the CGI program "creator2" generates the following SELECT statement.

<SELECT>
<OPTION>Please select</OPTION>
<OPTION value='TS-W-S'>T-shirt (white) S size</OPTION>
<OPTION value='TS-W-M'>T-shirt (white) M size</OPTION>
<OPTION value='TS-W-L'>T-shirt (white) L size</OPTION>
<OPTION value='PST-N-A0'>poster (glossy paper) A0</OPTION>
<OPTION value='PST-L-A0'>poster (laminated) A0</OPTION>
<OPTION value='PC'>post card</OPTION>
<OPTION value='MC-W'>mug (white)</OPTION>
<OPTION value='MC-BLK'>mug (black)</OPTION>
</SELECT>

When the Web browser 701 renders this SELECT statement, the selection field 2101 is displayed. When the drop-down menu is opened, the display 2106 is obtained.

Input fields 2102 to 2104 are used to designate arguments of the HTTP request. A print image URL is input to the field 2102, a thumbnail image URL is input to the field 2103, and a selling price is input to the field 2104.

At this time, the CGI program "creator2" established a session to the creator terminal 105 and stores, in session data, the creator ID "XXX" of the creator who has successfully logged in.

The session and session data will be described. Normally, communication using HTTP is nonpermanent. An HTTP request (A) transmitted from the creator terminal 105 to the support server 101 at a certain time is not relevant to an HTTP request (B) transmitted from the creator terminal 105 to the support server 101 at another time. A session is a mechanism in which the support server 101 manages to make it and the creator terminal 105 virtually execute permanent HTTP communication. Accordingly, the support server 101 can recognize that the above-described HTTP request (A) and HTTP request (B) are related to each other. A session is normally implemented by using a cookie. When the side of the support server 101 wants to start a session, a unique session ID is generated. The session ID is attached as a cookie to an HTTP response to be transmitted to the creator terminal 105. After that, each HTTP request transmitted from the creator terminal 105 to the support server 101 has this cookie. The support server 101 can acquire the session ID from the transmitted HTTP request through the cookie. If the session ID is acquired, and it equals the precedingly issued ID, the support server can recognize that the HTTP request when the session ID is issued is relevant to the current HTTP request (they are HTTP requests in the same session). In this way, permanent HTTP communication is virtually established. However, the period of durability equals the life of the cookie at longest. Session data is held in the internal storage unit 202 by using the session ID as a key. In permanent HTTP communication that is virtually established, this data can be read or written by the Web server 305 or CGI program 306 in the support server 101 at an arbitrary time during the period of durability.

Step S1807:

The creator inputs or selects an item on a sales merchandise registration window 2100 displayed on the Web browser 701 of the creator terminal 105 by using the keyboard 206 or pointing device 207.

FIG. 22 shows an example wherein input and selection have been done. As a print merchandise 2201, "T-shirt (white) S size" is selected. Similarly, as input items, "http://www.creator.jp/images/image1.jpg" is input to print image URL (2202), "http://www.creator.jp/thumb/thumb1.jpg" is input to a thumbnail image URL (2203), and "4000" is input to a selling price 2204.

When the creator clicks on an OK button 2205 by using the keyboard 206 or pointing device 207, the Web browser 701 transmits, to the Internet 102, an HTTP request containing the sales merchandise registration processing URL "http://www.server.jp/cgi/creator3" (405 in FIG. 4) and character strings selected or input to the fields 2201 to 2204 as arguments. For the field 2201, the character string transmitted as an argument is different to the display character string, as described above. For this reason, although "T-shirt (white) S size" is selected, the character string transmitted as an argument is "TS-W-S" by referring to the above-described SELECT statement.

The Web server 305 of the support server 101 receives the transmitted HTTP request through the Internet 102 and maps "creator3" as the CGI program 306 corresponding to the sales merchandise registration processing URL (405 in FIG. 4).

Step S1808:

The Web server 305 inputs the arguments of the HTTP request to the mapped CGI program "creator3". In this case, "TS-W-S" is input as the print merchandise code, "http://www.creator.jp/images/image1.jpg" is input as the print image URL, "http://www.creator.jp/thumb/thumb1.jpg" is input as the thumbnail image URL, and "4000" is input as the selling price.

First, the CGI program "creator3" transmits an HTTP request containing the print image URL "http://www.creator.jp/images/image1.jpg" to the Internet 102. As shown in FIG. 3, the CGI program itself can transmit an HTTP request and receive an HTTP response. The Web server 502 of the creator server 103 receives the transmitted HTTP request through the Internet 102. In accordance with the mapping shown in FIG. 6, the Web server 502 maps the URL "http://www.creator.jp/images/image1.jpg" to the file path name "/var/www/images/image1.jpg". The Web server 502 loads the image file 501 identified by the file path name "/var/www/images/image1.jpg" from the external storage device 204 and transmits an HTTP response having the contents of the image file as a body to the Internet 102. The CGI program "creator3" in the support server 101 receives the HTTP response through the Internet 102. The CGI program "creator3" reads out the contents of the image file from the body of the HTTP response and stores it as a temporary image file on the external storage device 204. This image file will be referred to as [A] hereinafter. If the print image URL designated by an argument is null, or an error message is returned from the Web server 502 of the creator server 103 in response to the transmitted HTTP request, the processing advances to step S1810. When the image file can normally be saved, the processing advances to step S1809.

Step S1809:

The CGI program "creator3" checks the arguments. The CGI program "creator3" checks first whether the print merchandise code corresponding to the print merchandise selected in the field 2201 is not null. If it is null, it is determined that an error has occurred, and the processing advances to step S1810. When "Please select" is selected in the field 2201, the value of the transmitted argument is null. Next, the CGI program "creator3" checks whether the print merchandise code is correct. Since the values of arguments to be transmitted are listed as OPTION statements in the field 2101, only the values designated in advance by the OPTION statements should be received. However, there is possibility that the HTTP request is altered and transmitted by imposing or the like. For this reason, the CGI program "creator3" instructs the database program 308 to search for a record in the print merchandise database 301 by using the print merchandise ID as a key. If no record is found, it is determined that an error has occurred, and the processing advances to step S1810. The record that is found at this time is also used for the subsequent check and will be referred to as [B]. In this case, since "TS-W-S" is input as the print merchandise code, the record 901 is detected from the records in the print merchandise database 301 (FIG. 9).

Next, the print image URL input to the field 2202 is checked. Since the print image is acquired from the print image URL "http://www.creator.jp/images/image1.jpg" in step S1808, reachability check of the URL has already been ended. This time, the resolution of the image file [A] temporarily stored on the external storage device 204 is checked. In the record [B] detected by the above print merchandise search, the allowable resolution (height) representing the allowable resolution in the direction of height and the allowable resolution (width) representing the allowable resolution in the direction of width are designated. The allowable resolutions corresponding to the print merchandise code "TS-W-S" are obtained as 1,200 pixels and 800 pixels, respectively, by referring to the record 901 shown in FIG. 9. It is checked whether the resolutions of the image file [A] temporarily stored on the external storage device 204 equal the allowable resolutions. As indicated by 601 in FIG. 6, the image file [A] designated by the URL "http://www.creator.jp/images/image1.jpg" is 1,200 pixels (height)×800 pixels (width). Hence, this check is successfully done. If it is determined that the resolution is not appropriate, it is determined that an error has occurred, and the processing advances to step S1810.

Subsequently, the thumbnail image URL input to the field 2203 is checked. An HTTP request containing the input URL "http://www.creator.jp/thumb/thumb1.jpg" is transmitted, and it is checked only whether the Web server 502 of the creator server 103 normally returns an HTTP response. If the thumbnail image URL designated by an argument is null, or the Web server 502 of the creator server 103 returns an error message or no response for the transmitted HTTP request, it is determined that an error has occurred, and the processing advances to step S1810. In this case, since mapping to the file path name corresponding to the URL "http://www.creator.jp/thumb/thumb1.jpg" is present, as indicated by 601 in FIG. 6, this check is successfully done.

Finally, the selling price input to the field 2207 is checked. In the record [B] detected by the above print merchandise search, the cost (minimum selling price) is designated. The selling price corresponding to the print merchandise code "TS-W-S" is obtained as "3,000" yen by referring to the record 901 shown in FIG. 9. It is checked whether the input selling price is equal to or higher than the cost (minimum selling price). If the selling price designated by an argument is null or lower than the cost (minimum selling price), the check fails, and the processing advances to step S1810. In this case, since "4,000" yen is input, this check is successfully done.

Step S1810:

If print image acquisition fails in step S1808, or an error is detected by checking the arguments in step S1809, the CGI program "creator3" outputs HTML data representing an error window. The Web server 305 transmits an HTTP response. The Web browser 701 of the creator terminal 105 receives the HTTP response through the Internet 102 and renders the data on the display 205 of the creator terminal 105.

In the rendered state, a message representing the error contents is additionally displayed on a sales merchandise registration window 2200 shown in FIG. 22.

Step S1811:

If argument check has successfully be done in step S1809, the CGI program "creator3" registers the sales merchandise record (FIG. 11) in the sales merchandise database 303.

First, the CGI program "creator3" newly issues the sales merchandise ID 1102. As shown in FIG. 11, the sales merchandise ID 1102 is designated to PK in combination with the creator ID 1101. Hence, the sales merchandise ID 1102 must be issued such that no duplication occurs between a plurality of records having the same creator ID 1101. In this example, a sales merchandise ID is issued in a numerical value format. A numerical value more than existing sales merchandise IDs is always newly issued. More specifically, the CGI program "creator3" causes the database program 308 to search for records using the creator ID "XXX" as a key. The sales merchandise IDs 1102 of the detected records are sequentially referred to. "Maximum value of the sales merchandise ID+1" is newly issued as a sales merchandise ID. If no record is found, the sales merchandise ID is set to "1001".

The sales merchandise ID issuing method is not limited to this. A sequence (the serial number issuing function in database management) for each creator may be formed in the sales merchandise database 303 and used. Only one sequence may be prepared in the entire sales merchandise database 303 and commonly used for all creators. Alternatively, a unique value may be generated by using time or a random number. That is, any method capable of guaranteeing uniqueness for each creator can be used.

Next, the CGI program "creator3" instructs the database program 308 to add a new record to the sales merchandise database 303. As described above, the sales merchandise database has the record structure shown in FIG. 11. The creator ID acquired from the session data is registered in the creator ID 1101 of the record. The newly issued sales merchandise ID is registered in the sales merchandise ID 1102 of the record. A print merchandise code corresponding to selection in the field 2201 is registered in the print merchandise code 1103 of the record. The print image URL input to the field 2202 is registered in the print image URL 1104 of the record. The thumbnail image URL input to the field 2203 is registered in the thumbnail image URL 1105 of the record. The selling price input to the field 2204 is registered in the selling price 1106 of the record.

Step S1812:

When record registration in the sales merchandise database 303 is ended, the CGI program "creator3" outputs HTML data representing a registration result window. The Web server 305 transmits an HTTP response to the Internet 102. The Web browser 701 of the creator terminal 105 receives the HTTP response through the Internet 102 and renders the data on the display 205 of the creator terminal 105.

FIG. 23 shows a state wherein rendering is ended. Reference numeral 2302 denotes print merchandise selected in the field 2201; 2303, a print image URL input to the field 2202; 2304, a thumbnail image URL input to the field 2203; 2305, a selling price input to the field 2204; 2301, a URL to give an order for the registered sales merchandise to the support server 101. The URL except arguments after "?" is mapped to the CGI program for "Add merchandise in cart", as indicated by 406 in FIG. 4. There are two arguments after "?". One argument designates the value "XXX" for an argument name "cid" and represents the creator ID. The other argument designates the value "1001" for an argument name "pid" and represents the sales merchandise ID.

The print image downloaded in step S1808 in FIG. 18 can be cached in the external storage device 204 of the support server 101 and used again when sales merchandise is to be registered for the same print image. The cached print image can also be used for printing on print merchandise. To use the cached print image, it must be checked whether the image file 501 to be mapped to the print image URL on the creator server 103 has been updated. If the image file has been updated, the cached print image must also be updated.

<Order Processing>

Processing for causing an orderer to access a homepage provided by the creator server 103 and order sales merchandise will be described next in detail with reference to FIGS. 24 to 30.

FIG. 24 is a table showing the contents of a record registered in the sales merchandise database 303 by the creator with the creator ID "XXX". Sales merchandise records 2401 to 2404 store information about the sales merchandise registered by the above-described sales merchandise registration processing.

Figure 25:
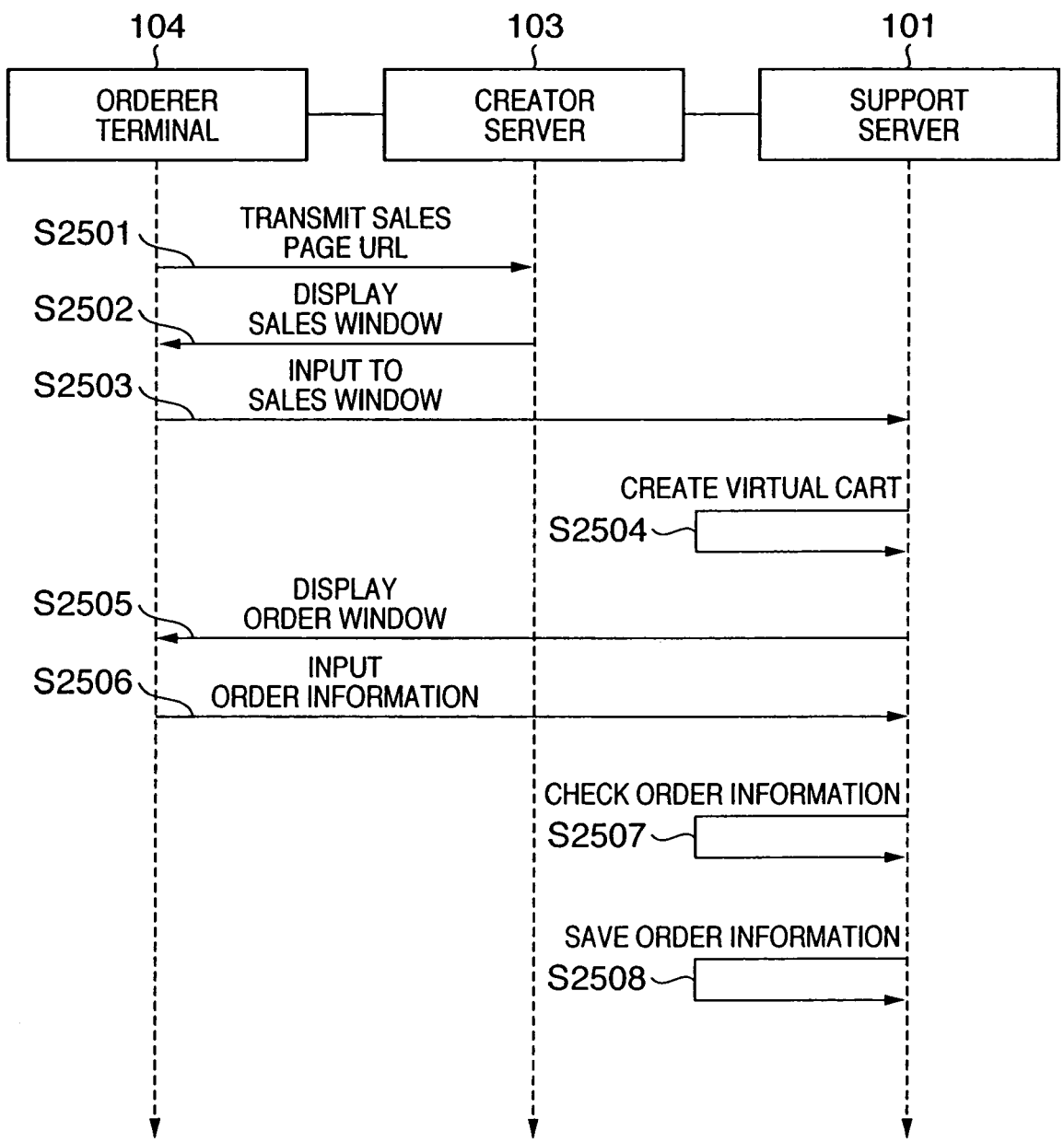
FIG. 25 is a sequence chart showing the sequence of order processing.

FIG. 25 is a sequence chart showing the sequence of order processing.

Step S2501 (providing of sales window):

The orderer inputs, to the Web browser 701 of the orderer terminal 104, the sales page URL "http://www.creator.jp/html/order.html" (605 in FIGS. 6 and 1608 in FIG. 16) provided by the creator by using the keyboard 206 or pointing device 207 to instruct browsing. The Web browser 701 of the orderer terminal 104 transmits an HTTP request containing the sales page URL to the Internet 102.

The Web server 502 of the creator server 103 receives the HTTP request through the Internet 102 and maps "/var/www/html/order.html" (605 in FIG. 6) as an HTML file corresponding to the sales page URL.

Step S2502 (display of sales window):

The Web server 502 transmits an HTTP response having the contents of the HTML file "/var/www/html/order.html" as a body to the Internet 102.

The Web browser 701 of the orderer terminal 104 receives the HTTP through the Internet 102 and renders HTML data representing a sales window as the body portion of the HTTP response on the display 205 of the orderer terminal 104.

Figure 26:
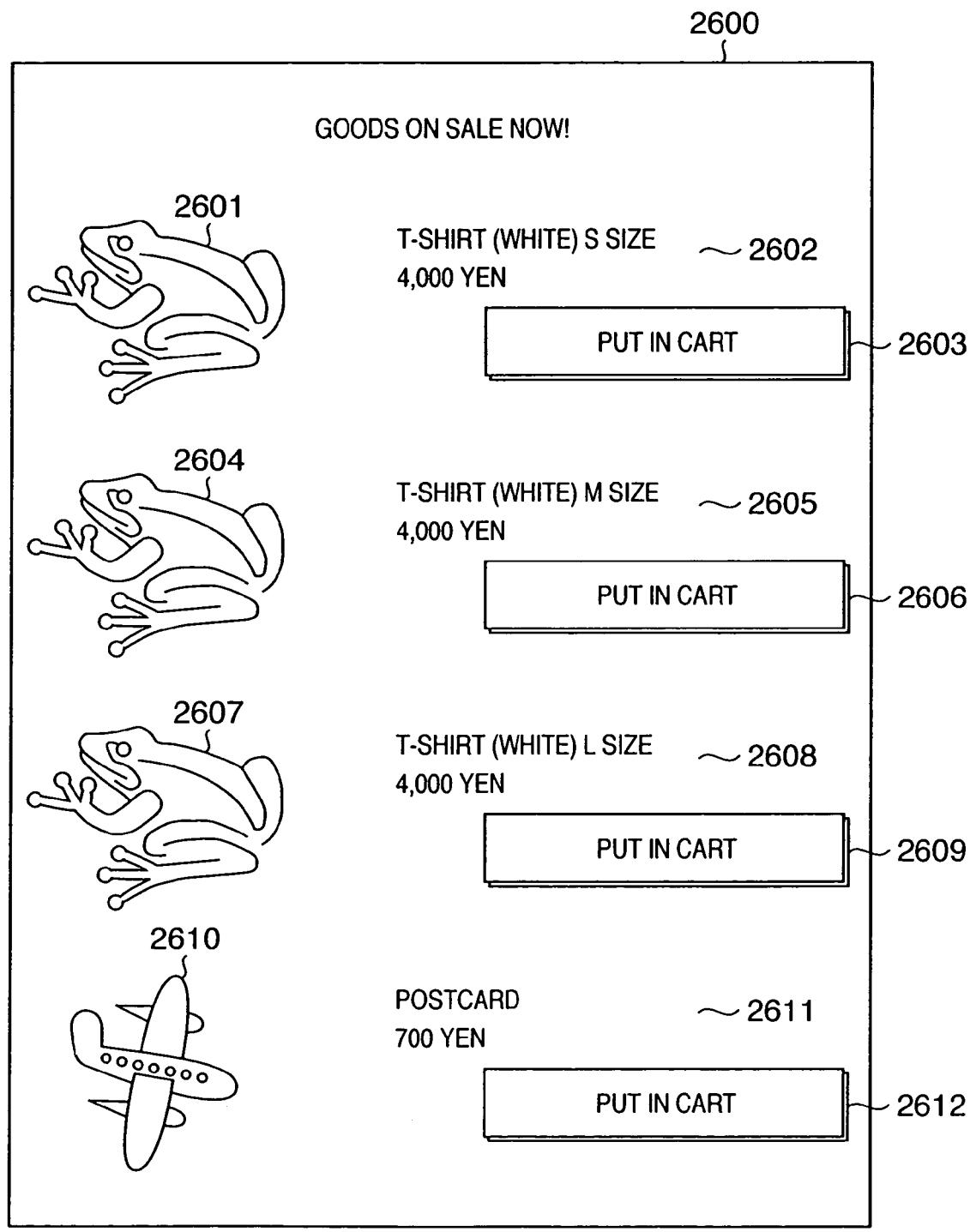
FIG. 26 is a view showing a sales window.

FIG. 26 shows a state of the sales window when rendering is ended. A sales window 2600 is based on the contents of the sales window display HTML file "/var/www/html/order.html". The sales window display HTML file is provided by the creator server 103 to receive, on the Internet 102, order for the sales merchandise (FIG. 24) registered in the sales merchandise database 303 of the support server 101 by the creator. For example, the creator creates the sales window display HTML file by using the creator terminal 105.

In the sales window display HTML file, the thumbnail image URL "http://www.creator.jp/thumb/thumb1.jpg" in a sales merchandise record 2401 is described by an <IMG> statement of HTML to display a thumbnail 2601 on the display 205. In addition, the sales window display HTML file is described to display, in a window 2602, the print merchandise name "T-shirt (white) S size" (901 in FIG. 9), which is referred to from the print merchandise database by using the print merchandise code "TS-W-S" of the sales merchandise record 2401, and the selling price "4,000" yen of the sales merchandise record 2401. In the sales window display HTML file, the URL "http://www.server.jp/cgi/order1?cid=XXX&pid=1001" 2301, which is issued by the support server 101 as the sales URL of the sales merchandise record 2401, is designated by an <A> statement of HTML as the sales link destination URL of a "put in cart" button 2603. This also applies to 2604 to 2612.

Step S2503 (input to sales window):

The orderer clicks on the "put in cart" buttons 2603, 2606, 2609, and 2612 on the sales window 2600 displayed on the Web browser 701 of the orderer terminal 104 by using the keyboard 206 or pointing device 207. When one of the "put in cart" buttons 2603, 2606, 2609, and 2612 is clicked on, the Web browser 701 of the orderer terminal 104 transmits, to the Internet 102, an HTTP request containing a sales link destination URL designated by the <A> statement in the sales window display HTML file in correspondence with the clicked "put in cart" button. For example, when the "put in cart" button 2603 is clicked on, the Web browser 701 transmits an HTTP request containing the designated sales link destination URL "http://www.server.jp/cgi/order1?cid=XXX&pid=1001" to the Internet 102.

The Web server 305 of the support server 101 receives the HTTP request through the Internet 102 and maps "order1" as the CGI program 306 corresponding to the sales link destination URL (406 in FIG. 4).

Step S2504 (create order record/virtual cart):

The CGI program "order1" checks whether a session has started between the support server 101 and the orderer terminal 104.

If no session has started yet, the CGI program "order1" issues an order ID to uniquely identify the session and instructs the database program 308 to add a new record (FIG. 12) to the order database 304. The database program 308 adds a new record, in which the newly issued order ID is set in the order ID 1201, the creator ID "XXX" designated by the argument "cid=XXX" is set in the creator ID 1202, the sales merchandise ID "1001" designated by the argument "pid=1001" is set in a sales merchandise ID #1 1206-1, and the formal order flag 1213 is set to "OFF".

The method of newly issuing an order ID is the same the above-described method of newly issuing a sales merchandise ID. That is, an order ID is issued in a numerical value format, and a numerical value more than existing order IDs is always newly issued.

On the other hand, if a session has started, the CGI program "order1" acquires the order ID from a cookie (to be described later) by using the HTTP request. The CGI program "order1" instructs the database program 308 to search for an order record (FIG. 12) in the sales merchandise database 303 by using the order ID as a key. Next, the CGI program "order1" compares the creator ID 1202 of the found record with the creator ID "XXX" designated by the argument "cid=XXX". If they do not coincide, sales merchandise of another creator corresponds to the virtual cart designed by the order ID. Hence, a new order ID is issued, as in the above-described processing for a new session. If the creator IDs coincide, the sales merchandise ID "1001" designated by the argument "pid=1001" is added to the found order record. For example, if the found order record already has a sales merchandise ID #1, sales merchandise ID #2, and sales merchandise ID #3, the sales merchandise ID "1001" is added as sales merchandise ID #4 (FIG. 12).

Assume that the contents stored in the order record in the order database 304 have the state shown in FIG. 29. "1001" is stored in an order ID 2901. "XXX" is stored in a creator ID 2902. Two pieces of sales merchandise are added to this order record. One is the sales merchandise ID #1 (2906-1) "1002", and the other is the sales merchandise ID #2 (2906-2) "1004". A formal order flag 2913 is "OFF".

Step S2505 (providing of order window):

The CGI program "order1" displays the contents of an order record 2900, i.e., the contents of the virtual cart designated by the order ID 2901 "1001", and simultaneously, outputs HTML data to display an order window to place an order for the sales merchandise. The Web server 305 transmits an HTTP response having order window display HTML data as a body to the Internet 102. The CGI program "order1" attaches the order ID to the HTTP response as a cookie.

The Web browser 701 of the orderer terminal 104 receives the HTTP response through the Internet 102 and renders the order window display HTML data as the body portion of the HTTP response on the display 205 of the orderer terminal 104. The Web browser 701 also stores the order ID attached to the cookie in the internal storage unit 202 or external storage device 204.

Figure 27:
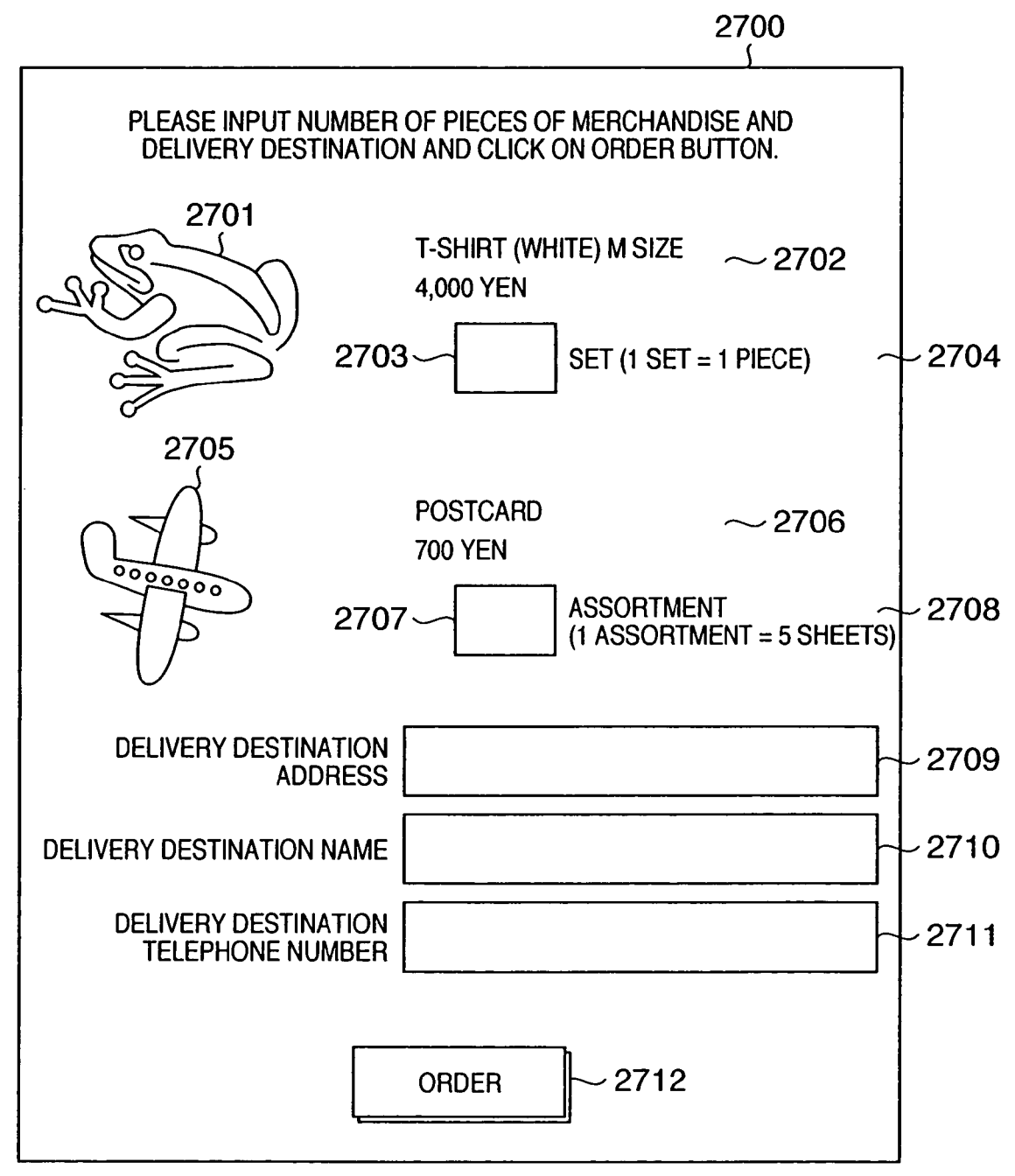

FIG. 27 shows a state of the order window when rendering is ended. The order window is formed by using the form function of HTML. In this example, an order content input URL "http://www.server.jp/cgi/order2" (407 in FIG. 4) is designated as the HTTP request transmission destination URL.

Reference numerals 2701 to 2704 denote information generated when the CGI program "order1" outputs HTML data to display the information of sales merchandise corresponding to the sales merchandise ID #1 (2906-1) of the order record 2900. First, the CGI program "order1" instructs the database program 308 to search for a record in the sales merchandise database 303 by using the creator ID 2902 "XXX" and sales merchandise ID #1 (2906-1) as a key. As a consequence, a sales merchandise record 2402 (FIG. 24) is obtained. Next, the CGI program "order1" generates HTML data by describing the thumbnail image URL "http://www.creator.jp/thumb/thumb1.jpg" of the sales merchandise record 2402 by the <IMG> statement of HTML. When the description of the HTML data is analyzed by the Web browser 701, the thumbnail image 2701 is displayed on the display 205. The CGI program "order1" also instructs the database program 308 to search the print merchandise database 301 by using the print merchandise code "TS-W-M" of the sales merchandise record 2402 as a key. As a result, the print merchandise record 902 is obtained. Next, the CGI program "order1" generates HTML data to display the print merchandise name "T-shirt (white) M size" 2702 of the print merchandise record 902. The CGI program "order1" inputs the number 2907 of pieces of ordered merchandise corresponding to the sales merchandise ID #1 (2906-1) and generates HTML data from the field 2703 to designate an argument of the HTTP request, and the order unit name, merchandise unit name, and the number of pieces of merchandise per order of the print merchandise record 902 to display "set (1 set=1 piece)". This also applies to 2705 to 2708.

Input fields 2709 to 2711 are used to designate arguments of the HTTP request. A delivery destination is input to the field 2709. The name of the delivery destination is input to the field 2710. The telephone number of the delivery destination is input to the field 2711.

Step S2506 (input to order window):

The orderer executes inputs on an order window 2700 displayed on the Web browser 701 of the orderer terminal 104 by using the keyboard 206 or pointing device 207.

FIG. 28 shows an example wherein the orderer has input. In this example, "2" is input as the number 2803 of pieces of ordered merchandise corresponding to the sales merchandise ID #1 (2906-1), "1" is input as the number 2807 of pieces of ordered merchandise corresponding to the sales merchandise ID #2 (2906-2), "XYZ Imaikami-cho Nakahara-ku, Kawasaki-shi" is input as a delivery destination address 2809, "Hanako Kosugi" is input as a delivery destination name 2810, and "044-XXX-YYYY" is input as a delivery destination telephone number 2811.

When the orderer clicks on an order button 2812 by using the keyboard 206 or pointing device 207, the Web browser 701 transmits, to the Internet 102, an HTTP request containing the order content input URL "http://www.server.jp/cgi/order2" (407 in FIG. 4) and character strings input to the fields 2803, 2807, and 2809 to 2811 as arguments.

The Web server 305 of the support server 101 receives the transmitted HTTP request through the Internet 102 and maps "order2" as the CGI program 306 corresponding to the order content input URL (407 in FIG. 4)

Step S2507 (setting of order record):

The Web server 305 inputs the arguments of the HTTP request to the mapped CGI program "order2". In this case, "2" is input as the number of pieces of ordered merchandise corresponding to the sales merchandise ID #1, "1" is input as the number of pieces of ordered merchandise corresponding to the sales merchandise ID #2, "XYZ Imaikami-cho Nakahara-ku, Kawasaki-shi" is input as the delivery destination address, "Hanako Kosugi" is input as the delivery destination name, and "044-XXX-YYYY" is input as the delivery destination telephone number.

Since the session has started in step S2504, the CGI program "order2" can acquire the order ID from the HTTP request through the cookie. The CGI program "order2" instructs the database program 308 to search for a record in the order database 304 by using the acquired order ID as a key. As a result, the order record 2900 (FIG. 29) is obtained. The CGI program "order2" stores the arguments of the HTTP request in the order record 2900. More specifically, the CGI program "order2" registers the delivery destination address "XYZ Imaikami-cho Nakahara-ku, Kawasaki-shi" of the argument in a delivery destination address 2903, the delivery destination name "Hanako Kosugi" of the argument in a delivery destination name 2904, the delivery destination telephone number "044-XXX-YYYY" in a delivery destination telephone number 2905, the number "2" of pieces of ordered merchandise corresponding to the sales merchandise ID #1 in number #1 (2907-1), and the number "1" of pieces of ordered merchandise corresponding to the sales merchandise ID #2 in number #2 (2907-2).

The CGI program "order2" instructs the database program 308 to search for a record in the sales merchandise database 303 by using the creator ID 2902 "XXX" and sales merchandise ID 2906-1 "1002" as a key. As a result, the selling price "4,000" yen of the sales merchandise record 2402 is obtained. In a similar manner, a selling price "700" yen is obtained for the sales merchandise ID #2 (2906-2) "1004". A value obtained by multiplying the selling price "4,000" yen of the sales merchandise #1 by the ordered number "2" of the sales merchandise #1 is added to a value obtained by multiplying the selling price "700" yen of the sales merchandise #2 by the ordered number "1" of the sales merchandise #2. The sum "8,700" yen is registered in a total sales amount 2910. In addition, "435" yen obtained by multiplying the total sales amount "8,700" yen by the consumption tax rate (5% in this example) is registered in a consumption tax amount 2911.

Next, the CGI program "order2" instructs the database program 308 to search for a record in the sales merchandise database 303 by using the creator ID 2902 "XXX" and sales merchandise ID 2906-1 "1002" as a key. As a result, the sales merchandise record 2402 (FIG. 24) is obtained. In addition, the CGI program "order2" instructs the database program 308 to search the print merchandise database 301 by using the print merchandise code "TS-W-M" of the sales merchandise record 2402 as a key. As a result, the cost (minimum selling price) "3,000" yen of the print merchandise record 902 (FIG. 9) is obtained. In a similar manner, for the sales merchandise ID #2 (2906-2) "1004", the cost (minimum selling price) "500" yen is obtained. A value obtained by multiplying the cost "3,000" yen of the sales merchandise #1 by the ordered number "2" of the sales merchandise #1 is added to a value obtained by multiplying the cost "500" yen of the sales merchandise #2 by the ordered number "1" of the sales merchandise #2. The sum "6,500" yen is registered in a total cost amount 2912.

Finally, the CGI program "order2" registers the formal order flag 2913 to "ON". Thus, order is ended.

FIG. 30 shows the registered record.

The support server 101 searches for an order record whose formal order flag (1213) is "ON" and, in accordance with the contents indicted by the pieces of sales merchandise #1 (1206) to #n (1206-n), instructs a printing apparatus or a print server connected to a printing apparatus to print the print image on the print merchandise, thereby producing the pieces of sales merchandise #1 to #n.

The support server 101 notifies a computer apparatus installed by a delivery agent of the contents represented by the "delivery destination address" (1203), "delivery destination name" (1204), and "delivery destination telephone number" (1205) to instruct to deliver the produced sales merchandise #1 to #n.

The support server 101 also instructs a computer apparatus installed by a financial agency to bill the user a charge amount indicated by the "total sales amount" (1210)+"consumption tax amount" (1211) and collect the amount and pay an amount indicated by the "total sales amount" (1210)−"total cost amount" (1212) to the creator identified by the creator ID (1202). At this time, the computer apparatus installed by the financial agency is notified of, as the payment destination, the "remittance destination financial agency" (1009), "remittance destination branch" (1010), "remittance destination account type" (1011), "remittance destination account number" (1012), and "remittance destination account holder name" (1013) in the creator database 302.

For charging for the user and collection from the user, online payment using the service of a financial agency or a convenience store or settlement by a credit card can be used.

In this embodiment, HTTP is used as the communication protocol for the Web server. However, the present invention is not limited to this. More preferably, a secure protocol such as HTTPS is used because communication data contains personal information.

The creator server 103 and creator terminal 105 shown in FIG. 1 may be a single apparatus.

Each of the support server 101, creator server 103, orderer terminal 104, and creator terminal 105 may include a plurality of computer apparatuses or a single computer apparatus.

In this embodiment, sales merchandise is produced by printing image data on print merchandise such as a T-shirt or mug. The present invention can also be applied to sales merchandise produced by outputting content data such as audio data to an output medium such as a CD (Compact Disk).

<Other Embodiments>

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. A merchandise sales system which sells, through a network, merchandise produced by printing image data on a printing medium, the system including a supporting server apparatus, a creator server apparatus and an orderer terminal,
said supporting server apparatus comprising:
a merchandise information receiving unit which receives, from said creator server apparatus, merchandise information about a location of the image data on the network and a printing form for printing the image data to the printing medium;
a generating unit which generates a merchandise address for each of pieces of the merchandise information; and
an address transmitting unit which transmits the merchandise address to said creator server apparatus, and
said creator server apparatus comprising:
a creating unit which creates a sales window display file containing the merchandise address;
a file sending unit which sends the created sales window display file to the orderer terminal; and
a registering unit which registers, with said supporting server apparatus, remittance destination information, as a payment destination to be paid for merchandise produced by printing the image data according to merchandise information corresponding to a merchandise address selected by said orderer terminal which displays the sales window based on the sales window display file,
wherein said supporting server apparatus receives the merchandise address, which is selected from the sales window display file, from said orderer terminal, downloads the image data according to the merchandise information corresponding to the received merchandise address, executes print processing of the downloaded image data based on the merchandise information corresponding to the received merchandise address so as to produce the merchandise and notifies payment for the merchandise based on the remittance destination information registered by said registering unit.

2. The system according to claim 1, wherein the sales window display file is described by HTML so as to be analyzed and reproduced by a Web browser of said orderer terminal.

3. The system according to claim 1, wherein said supporting server apparatus further comprises a unit which transmits, to a printing apparatus, an instruction to print the image data associated with the merchandise address to the printing medium, wherein the location and the printing form of the image data is specified from the merchandise information associated with the merchandise address.

4. A supporting server apparatus which executes associated processing for selling, through a network, merchandise produced by printing image data on a printing medium, said supporting server apparatus communicating through the network with a creator server apparatus and an orderer terminal, said supporting server apparatus comprising:
a merchandise information receiving unit which receives, from the creator server apparatus, merchandise information about a location of the image data on the network and a printing form for printing the image data to the printing medium;
a generating unit which generates a merchandise address for each of pieces of the merchandise information;
an address transmitting unit which transmits the merchandise address to said creator server apparatus, wherein said creator server apparatus creates a sales window display file containing the merchandise address, and sends the sales window display file to the orderer terminal;
a registering unit which registers remittance destination information, received from said creator server apparatus, as a payment destination to be paid for merchandise produced by printing image data according to the merchandise information corresponding to a merchandise address selected by said orderer terminal which displays the sales window based on the sales window display file; and
a receiving unit which receives the merchandise address, which is selected in the sales window, from the order terminal, downloads the image data according to the merchandise information corresponding to the received merchandise address, executes print processing of the downloaded image data based on the merchandise information corresponding to the received merchandise address so as to produce the merchandise and notifies payment for the merchandise based on the remittance destination information registered by said registering unit.

5. The apparatus according to claim 4, wherein the sales window display file is described by HTML so as to be analyzed and reproduced by a Web browser of the orderer terminal.

6. The apparatus according to claim 4, further comprising a unit which transmits, to a printing apparatus, an instruction to print the image data associated with the merchandise address to the printing medium, wherein the location and the printing form of the image data is specified from the merchandise information associated with the merchandise address.

7. A computer-readable storage medium on which is stored a computer-executable program which causes a supporting server apparatus to execute associated processing for selling, through a network, merchandise produced by printing image data on a printing medium, said supporting server apparatus communicating through the network with a creator server apparatus and an orderer terminal, the program causing the supporting server apparatus to execute steps of:

receiving, from the creator server apparatus, merchandise information about a location of the image data on the network and a printing form in printing the image data to the printing medium;

generating a merchandise address for each of pieces of the merchandise information;

transmitting the merchandise address information to said creator server apparatus, wherein said creator server apparatus creates a sales window display file containing the merchandise address, and sends the sales window display file to the orderer terminal;

registering in registering unit remittance destination information, received from said creator server apparatus, as a payment destination to be paid for merchandise produced by printing image data according to the merchandise information corresponding to a merchandise address selected by said orderer terminal which displays the sales window based on the sales window display file; and receiving, from the orderer terminal, the merchandise address, which is selected in the sales window display file, downloading the image data according to the merchandise information corresponding to the received merchandise address, executing print processing of the downloaded image data based on the merchandise information corresponding to the received merchandise address so as to produce the merchandise, and notifying of payment for the merchandise based on the remittance destination information registered by said registering step.

* * * * *